(12) United States Patent
Kaji et al.

(10) Patent No.: US 7,027,600 B1
(45) Date of Patent: Apr. 11, 2006

(54) AUDIO SIGNAL PROCESSING DEVICE

(75) Inventors: Toshiyuki Kaji, Tokyo (JP); Naomi Yamamoto, Tokyo (JP); Toshihiro Nakane, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 0 days.

(21) Appl. No.: 09/526,688

(22) Filed: Mar. 15, 2000

(30) Foreign Application Priority Data

Mar. 16, 1999 (JP) ................................ 11-070123

(51) Int. Cl.
*H04R 5/00* (2006.01)

(52) U.S. Cl. ........................... 381/17; 463/35; 345/419

(58) Field of Classification Search ................. 381/17, 381/1, 63, 61; 463/35; 345/419
See application file for complete search history.

(56) References Cited

U.S. PATENT DOCUMENTS

| | | | | |
|---|---|---|---|---|
| 5,768,393 A * | 6/1998 | Mukojima et al. ............ 381/17 |
| 5,862,229 A * | 1/1999 | Shimizu ...................... 345/419 |
| 5,943,427 A * | 8/1999 | Massie et al. .................. 381/1 |
| 5,993,318 A * | 11/1999 | Kousaki ....................... 434/69 |
| 6,078,669 A * | 6/2000 | Maher .......................... 381/17 |
| 6,572,475 B1 * | 6/2003 | Okabe et al. ................. 463/30 |

\* cited by examiner

*Primary Examiner*—Brian T. Pendleton
(74) *Attorney, Agent, or Firm*—Finnegan, Henderson, Farabow, Garrett & Dunner, L.L.P.

(57) ABSTRACT

The audio signal processing device of the present invention arranges objects in a virtual three-dimensional space and generates audio signals by performing, at a prescribed listening position, audio simulation to sounds generated from a prescribed sounding position. This invention is characterized in that the sound field space subject to audio simulation is structured by combining spatial objects and audio simulation is performed thereto. Here, "spatial object" shall mean the space (sound field space) for audio simulation which was simply modeled in order to simplify audio simulation, and is a virtual object provided with prescribed audio parameters. The sound field space is structured by combining these spatial objects.

6 Claims, 18 Drawing Sheets

FIG.20

| FREQUENCY [Hz] | TEMPERATURE [°C] | RELATIVE HUMIDITY [%] | | | |
|---|---|---|---|---|---|
| | | 30 | 50 | 70 | 90 |
| 500 | −10 | 0.56 | 0.32 | 0.22 | 0.18 |
| | 0 | 0.28 | 0.19 | 0.17 | 0.16 |
| | 10 | 0.22 | 0.18 | 0.16 | 0.15 |
| | 20 | 0.21 | 0.18 | 0.16 | 0.14 |
| 1000 | −10 | 1.53 | 1.07 | 0.75 | 0.57 |
| | 0 | 0.96 | 0.55 | 0.42 | 0.38 |
| | 10 | 0.59 | 0.45 | 0.40 | 0.36 |
| | 20 | 0.51 | 0.42 | 0.38 | 0.34 |
| 2000 | −10 | 2.61 | 3.07 | 2.55 | 1.95 |
| | 0 | 3.23 | 1.89 | 1.32 | 1.03 |
| | 10 | 1.96 | 1.17 | 0.97 | 0.89 |
| | 20 | 1.29 | 1.04 | 0.92 | 0.84 |
| 4000 | −10 | 3.36 | 5.53 | 6.28 | 6.05 |
| | 0 | 7.70 | 6.34 | 4.45 | 3.43 |
| | 10 | 6.58 | 3.85 | 2.76 | 2.28 |
| | 20 | 4.12 | 2.65 | 2.31 | 2.14 |
| 5940 | −10 | 4.11 | 6.60 | 8.82 | 9.48 |
| | 0 | 10.54 | 11.34 | 8.90 | 6.84 |
| | 10 | 12.71 | 7.73 | 5.47 | 4.30 |
| | 20 | 8.27 | 4.67 | 3.97 | 3.63 |

AUDIO SIGNAL PROCESSING DEVICE

BACKGROUND OF THE INVENTION

1. Field of the Invention

The present invention generally relates to technology of structuring an audio-transmission system based on object data for drawing pictures of a virtual three-dimensional space on a screen, and simulating audio signals pursuant to such audio-transmission system. Particularly, this invention relates to technology of performing simplified operations of audio simulation.

2. Description of the Related Art

In game devices, songs or voices are output in correspondence with scenes together with the motion picture displayed on the screen in order to enhance the ambience. For example, a virtual game space is formed by arranging various objects or virtual characters (objects) in a virtual space composed of three-dimensional coordinates and, upon a main character of the game freely moving in the game space and progressing in the game, music is played as background music in correspondence with such scenes. Further, car race games are structured to generate sounds of engines, skidding, collisions, etc. in correspondence with the game progress. Thus, to the program storing the game story, further stored in advance are audio signals outputs of, for example, music, voices, and sound effects corresponding to the screen to be displayed in accordance with the game progress. The block diagram of conventional game device hardware having such a function is shown in FIG. 33.

The game device shown in FIG. 33 comprises a main CPU 1, memory 2, sound processor 3, CG drawing unit 4, display 5, speakers 6a and 6b, and I/O interface 7. The I/O interface 7 includes a CD-ROM cartridge interface for interfacing with recording mediums such as a CD-ROM, and interface of input devices such as control pads. Game program data provided from mediums such as a CD-ROM is supplied to the memory 2 via the I/O interface 7, object data (i.e., coordinate data and shape data of polygons) is supplied to the CG drawing unit 4, and sound data (song data and waveform data arranged as audio for background music or engine sounds of cars) and sound control data such as MIDI formats are supplied to the sound processor 3. The CG drawing unit 4 includes a frame buffer, color RAM, encoder, etc., and represents objects displayed on the display 5 as polygons (three-dimensional figures composed of apexes and ridgelines defined in a model coordinate system) pursuant to command data supplied from the main CPU 1. The CG drawing unit 4 further displays this on the display 5 upon performing modeling conversion to a world coordinate system, visual field conversion to a prescribed camera viewpoint, three-dimensional clipping processing, hidden line processing, texture mapping processing, shading processing, display priority processing, and so forth.

The sound processor 3 includes the likes of a sound memory, sound CPU, and D/A converter for conversion to two-channel audio signals. Identification (ID) information and sound data corresponding to sound source types are associated and registered to the sound memory. The sound CPU reads out sound data from the sound memory based on ID information of the sound source designated by the main CPU 1, realizes special sound effects such as an echo, reverb, chorus, etc. based on the DSP function, and outputs audio signals to the speakers 6a and 6b. The main CPU 1 interprets game program commands corresponding to input operations from input devices such as controller pads operated by a player, and performs prescribed image processing and audio processing. For example, upon performing audio processing while displaying images of a scene wherein a car is travelling along a bumpy road in a virtual three-dimensional space, the following processing is performed. Supplied from the main CPU 1 to the CG drawing unit 4 is command data relating to the drawing of objects (cars), and supplied from the main CPU 1 to the sound CPU is ID information predetermined in accordance with the sound source type (skidding sound, engine sound, etc.). This ID information is priorly stored in the program according to game scenes (e.g., a sound source for generating driving sounds is designated if it is a driving scene of a car), or, is used for sound processing (e.g., for designating collision sounds of cars) according to the type of prescribed event (e.g., collision) which occurs to an object. The sound CPU reads the registered sound data associated with ID information from the sound memory and outputs this to the speakers 6a and 6b.

The audio processing realized in the aforementioned conventional art, however, gives no consideration to the relationship of the sound source position and the listening position (sound-receiving point) on the screen, and merely reads sound data from the sound memory and outputs this to the speakers. In other words, no consideration is given to the panning of sound images or the level of volume. Further, no consideration is given to the sound generated from the sound source being influenced by objects such as walls arranged in the three-dimensional space; for example, influence from shielding or reflection, or reflection coefficients characteristic to such object. It was therefor not possible to realize so-called 3D sounds based on the actual environment. That is, although in reality the distance between the sound source position and the listening position (sound-receiving point) and the reflective states of sound continuously change temporally, a prescribed sound was expressed with several or a single representative sound source. For example, when a car drives through a tunnel, the same sound was generated without giving consideration to the vehicle type, travelling speed thereof, or the size, shape, length, etc. of the tunnel. Similarly, no consideration was given at all to the reflected sound from the tunnel or the driving sound and the like of other cars. Moreover, unnaturalness was caused due to the driving sound of cars being the same in the city as well as along the coastline.

Nevertheless, complex and difficult operations would be necessary for setting an audio transmission system in the virtual three-dimensional space and precisely simulating the sound generated from the sound source object at the sound-receiving point. For instance, audio signals have surface acoustic waves, the medium thereof being solid, liquid, gas, and create various audio phenomena by emission, transmission, absorption, refraction, diffraction, interference, dispersion, scattering, or diffusion in forms of surface waves, spherical waves, standing waves, progressive waves, etc. The analysis of sound fields is conducted with a wave equation, finite boundary element method, and so on, and generally requires vast operational loads and is not adequate for complex sound fields. Especially, such as in games, when the virtual three-dimensional space environment changes momentarily in accordance with the game progress and the propagation characteristics of sounds composing the sound transmission system change in real time; for example, when scenes change temporally and continuously such as a sound-generating object gradually approaching and retreating from the listening position, desired is audio simulation pursuant to simplified operations.

SUMMARY OF THE INVENTION

An object of the present invention therefore is to provide an audio signal processing device and game device for generating audio signals based on a sound field environment formed inside a virtual three-dimensional space. Another object of the present invention is to provide an audio signal processing device and game device capable of realizing simplified audio simulation. Still another object of the present invention is to provide an information recording medium storing a program thereon for making a computer function as the aforementioned audio signal processing device or game device.

An audio signal processing device according to the present invention generates audio signals by arranging objects in a virtual three-dimensional space and performing, at a prescribed listening position, audio simulation to sounds produced from a prescribed sounding position. The audio signal processing device comprises audio signal processing means for performing audio simulation by structuring a sound field space, which is subject to audio simulation, by combining spatial objects.

Here, "spatial object" shall mean the space (sound field space) for audio simulation which was simply modeled in order to simplify audio simulation, and is a virtual object provided with prescribed audio parameters. The sound field space is structured by combining these spatial objects.

Preferably, the audio signal processing means performs audio simulation upon setting audio parameters characteristic to the spatial objects. These audio parameters are medium parameters of spatial objects, or reflection parameters of the face composing the spatial objects. Here, "medium parameters" shall mean parameters such as the attenuation coefficient, humidity, temperature, etc. of the sound determined for each type of medium (air, water, soil, etc.) set within the spatial object, and "reflection parameters" shall mean the reflectance, transmittivity, or refractive index of the sound entering the faces composing the spatial object.

In order to simplify the audio simulation and to lighten the operational load, it is preferable that the shape of the spatial objects is a rectangular parallelepiped. Upon structuring the spatial objects to be a rectangular parallelepiped, it is possible to set different reflection parameters for the respective faces and realize a sound field space conforming to an actual space. According to this structure, in addition to simplifying audio simulation, a more realistic audio simulation is possible.

Preferably, the audio signal processing means divides audio simulation into direct sound, primary reflected sound, high-order reflected sound, and respectively performs simulation thereto.

For example, the audio signal processing means generates audio signals of the direct sound pursuant to distance data of the sounding position and listening position, and medium parameters. When the sounding position moves relatively to the listening position in the sound field space composed of a plurality of spatial objects connected to each other, two faces for dividing the sound field space into three areas are set. Of the two faces, the face near the listening position is set as face R and the face far from the listening position is set as face G. Further, the area including the listening position and divided by face R is set as area X (real area), the area divided by face R and face G is set as area Y (transient area), and the remaining area is set as area Z (gimmick area); and intersections of the movement locus of the sounding position with face R and face G are respectively set as point B and point E, and a prescribed point preset on face G is set as point D. When the sounding position is positioned in area Z, the sum of the length of the perpendicular line drawn from the sounding position to face G and the length between the listening position and point D is set as the propagation distance of the direct sound. When the sounding position is positioned in area Y, sought is point C which interiorly divides segment BD to become BA to AE when the sounding position is set as point A, and the distance between the listening position and point C is set as the propagation distance of the direct sound. When the sounding position is positioned in area X, the distance between the listening position and the sounding position is set as the propagation distance.

By operating the direct sound as above even when the sounding position is moving, the distance between the listening position and the sounding position and the direction of the sounding position (gimmick position) seen from the listening position will continuously change, even if the spatial objects are non-linearly connected. Thereby, the operation of direct sound signals is simplified, and audio simulation in an actual space is reproduced as faithfully as possible.

Face R and face G may be set in consideration of the shape of spatial objects and the connective state between such spatial objects. It is preferable that point D is the central point of face G. By making point D the central point of face G, errors between the actual sounding position and the gimmick position may be minimized on the average.

Upon generating audio signals of primary reflected sound, the propagation path of the primary reflected sound is set such that the incidence angle and the reflection angle of the sound reflected by the face composing the spatial object become equal based on the sounding position and listening position, and audio simulation is performed based on the propagation distance of the respective propagation paths, and medium parameters.

Upon generating audio signals of high-order reflected sound, audio simulation is performed based on the size of the spatial object, and medium parameters.

Further, in order to simplify the audio simulation, the audio signal processing means cancels the audio simulation when the output level of the sound produced from the sounding position exceeds a fixed attenuation at the listening position. According to this processing, wasteful operation can be omitted and the operational load for audio simulation can be lightened. The audio signal processing means further performs audio simulation upon handling the object as a point or face possessing audio parameters when an object structuring the audio transmission system exists within the spatial object. With this processing, it is possible to lighten the operational load of audio simulation even when an object, which reflects or transmits sound within the spatial object, exists.

A game device according to the present invention displays on a screen pictures of objects arranged in a virtual three-dimensional space, performs audio simulation at a prescribed listening position to sound produced from a prescribed sounding position, and outputs audio signals, the game device comprising: image display means for displaying images of objects on the screen; controller for supplying to the image display means object data for displaying on the screen images of the objects; and audio signal processing means for performing audio simulation; wherein the audio signal processing means performs audio simulation by receiving object data from the controller, structuring an audio transmission system based on the object data, and composing the sound field space subject to audio simulation by combining spatial objects.

Here, object data shall mean coordinate data, shape data, etc. of polygons composing such objects. By structuring the game device as above, realized is audio simulation giving consideration to the position, shape, direction, size, etc. of the object to be displayed on the game screen. Further, as the sound field space subject to audio simulation is composed of spatial objects, the operational load upon audio simulation is considerably lightened.

An information recording medium according to the present invention is a computer-readable information recording medium having recorded thereon a program for making a computer function as the audio signal processing device or the game device according to this invention. Here, information recording medium shall mean any medium having recorded thereon information, mainly digital data and programs, by some type of physical means, and capable of making a computer or dedicated processor realize desired functions. In other words, any means capable of downloading onto a computer and making it realize desired functions will suffice. For example, this would include a flexible disk (FD), hard disk (HD), CD-ROM, CD-R, DVD-ROM, DVD-RAM, DVD-R, PD, MD, MO, and so forth. Moreover, this shall also include cases upon receiving data transfer from a host computer via a wire- or radio-communication circuit (public circuit, data-dedicated circuit, satellite circuit, etc.). For example, transferring data from a server database via the Internet would also be included therein.

BRIEF DESCRIPTION OF THE DRAWINGS

FIG. 20 is a chart compiling the attenuation coefficient of sounds for each medium parameter.

DESCRIPTION OF THE PREFERRED EMBODIMENTS

The preferred embodiments are now explained with reference to the respective drawings.

(Structure of Audio Signal Processing Device)

Figure 1:
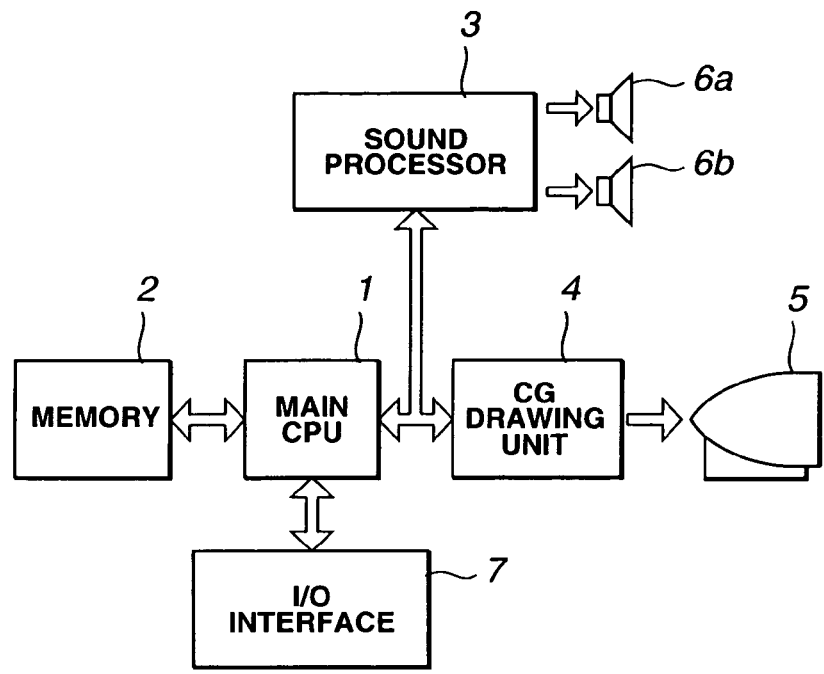
FIG. 1 is a hardware block diagram of the audio signal processing device according to the present embodiment.

The structure of the audio signal processing device according to the present embodiment is now explained with reference to FIG. 1. The audio signal processing device comprises a main CPU 1, memory 2, sound processor 3, CG drawing unit 4, display 5, speakers 6a and 6b, and I/O interface 7. The I/O interface 7 includes a CD-ROM cartridge interface for interfacing with recording mediums such as a CD-ROM, and interface of input devices such as control pads. Game program data provided from mediums such as a CD-ROM is supplied to the memory 2 via the I/O interface 7, object data is supplied to the CG drawing unit 4, and sound data (song data and waveform data arranged as audio for background music or engine sounds of cars) and sound control data such as MIDI formats are supplied to the sound processor 3.

Together with forming images in a virtual three-dimensional space pursuant to operations of the controller pad by the player, audio processing steps to make sounds generated from a sound source object be heard at a sound-receiving point are performed as follows. Foremost, object data for forming images is supplied from the main CPU 1 to the CG drawing unit 4. Specifically, data representing the shape, position (respective vertex coordinates of polygons), direction, etc. as well as texture data and the like of various objects are supplied. The CG drawing unit 4 arranges these various objects in the virtual three-dimensional space based on the aforementioned information, performs modeling conversion to a world coordinate system, visual field conversion to a prescribed camera viewpoint, three-dimensional clipping processing, hidden-line processing, texture mapping processing, shading processing, display priority processing, etc., and then displays the result on the display 5. The sound processor 3 generates audio signals based on the aforementioned object data supplied to the CG drawing unit 4. Particularly, the sound processor 3 performs audio processing (audio simulation) such that the sound generated from the sound source object can be heard at a prescribed sound-receiving point based on data relating to the shape, position, direction, etc. of the various objects arranged in the virtual three-dimensional space, as well as on the surrounding environment (e.g., environment set per game scene; such as indoors, city, forest, desert, underwater, etc.) of such objects. The sound processor 3 includes a sound memory, sound CPU, and D/A converter for conversion into two-channel audio signals, and outputs the result of the aforementioned audio processing to the speakers 6a and 6b. The detailed structure of the sound processor 3 will be described later.

(Realization of Sound Field Space with Spatial Objects)

Figure 12:
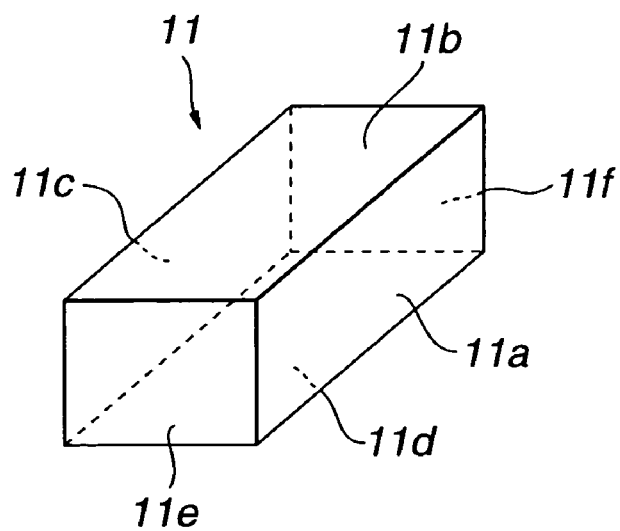
FIG. 12 is a diagram explaining the spatial object.

Although the sound processor 3 performs audio simulation based on data relating to the shape, position, direction, etc. of the various objects arranged in the virtual three-dimensional space, as well as on the surrounding environment of such objects as mentioned above, in order to simplify the simulation operation, the sound field space is modeled as a space having a shape of a rectangular parallelepiped, cylinder, sphere, etc. FIG. 12 shows a spatial object 11 wherein a sound field space is modeled as a rectangular parallelepiped. A sound field space is realized by combining arbitrary spatial objects in accordance with the environment (e.g., environment set per game scene; such as indoors, city, forest, desert, underwater, etc.) of the virtual space set for each game scene. This spatial object is not displayed on the game screen, and is an invisible object used for the operation of audio simulation.

The rectangular parallelepiped spatial object 11 shown in FIG. 12 comprises six planes 11a to 11f. Each plane has its own characteristic reflectance (characteristic audio impedance) $\gamma_a$ to $\gamma_f$. By arbitrarily setting the reflectance of the respective planes, various sound field spaces may be formed. For example, in order to realize a sound field space (free space) with only the ground, such as a prairie with no surrounding buildings or obstacles, the reflectance of plane 11d representing the ground should be set, for example, somewhere between 0.5 and 0.7, and the remaining planes 11a to 11c, 11e, and 11f are set to 0. By setting the reflectance as above, for example, sound entering plane 11a will continue to proceed without being reflected, and sound entering plane 11d will be reflected at an appropriate reflectance. Therefore, realized is a sound field space with only the ground, such as a prairie with no surrounding buildings or obstacles. Further, in order to realize a sound field space having a partially closed space, such as in a tunnel, for example, the reflectance of planes 11a to 11d are set to roughly 0.8 and the reflectance of planes 11e and 11f are set to 0. By setting the reflectance of the respective planes as above, sound entering planes 11a, 11b, etc. will be reflected, and sound entering planes 11e and 11f will continue to proceed. Thus, realized is a sound field space with planes 11e and 11f as the entrance (or exit) of the tunnel. Moreover, in order to realize a completely closed sound field space, such as indoors, a prescribed reflectance (0.9 for example) maybe provided to all six planes 11a to 11f. According to this setting, sound will be reflected at all planes and realized is a sound field space as though indoors.

Figure 13:
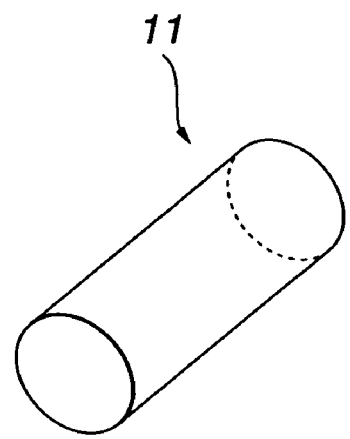
FIG. 13 is a diagram explaining the spatial object.
Figure 14:
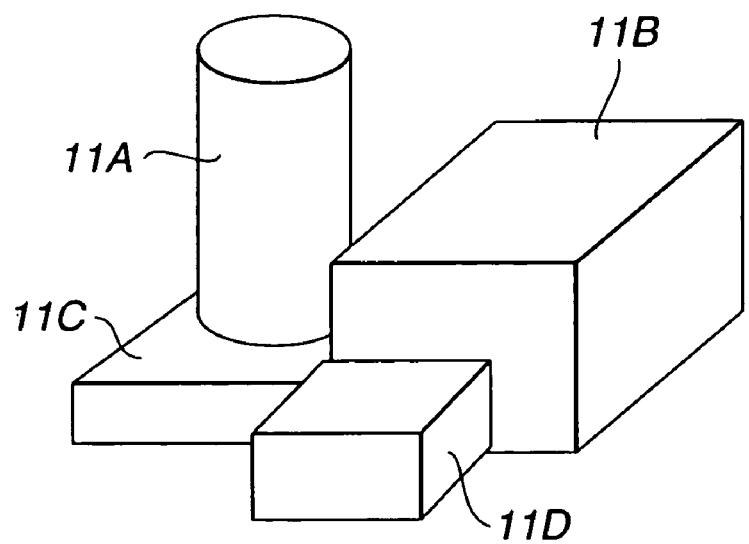
FIG. 14 is a diagram explaining the spatial object.

In addition, the spatial object 11 may be a cylindrical shape as shown in FIG. 13. The spatial object 11 may otherwise be a sphere, cone, pyramid, prism, or a 4-, 12- or 20-sided shape. Nevertheless, in order to lighten the operational load of audio simulation, a rectangular parallelepiped (or a cubical) spatial object is preferable. Further, as shown in FIG. 14, the sound field object realized in the virtual three-dimensional space may be structured upon suitably combining these spatial objects. In FIG. 14, rectangular parallelepiped spatial objects 11B to 11D are combined with a cylindrical spatial object 11A. Thus, by preparing spatial objects in adequate sizes, a sound field space in an arbitrary shape is realized. Especially, upon setting the sound field space as indoors, it is necessary to precisely reproduce the interior in order to accurately perform audio simulation. Therefore, a desired sound field space is easily realized by the combination of spatial objects as mentioned above. Moreover, instead of performing audio simulation as is in a sound field space having a complex shape, audio simulation may be performed for each spatial object and the combination of the results thereof will realize the audio simulation of the overall sound field space. Accordingly, complex operations are simplified.

(Outline of Audio Simulation)

Figure 15:
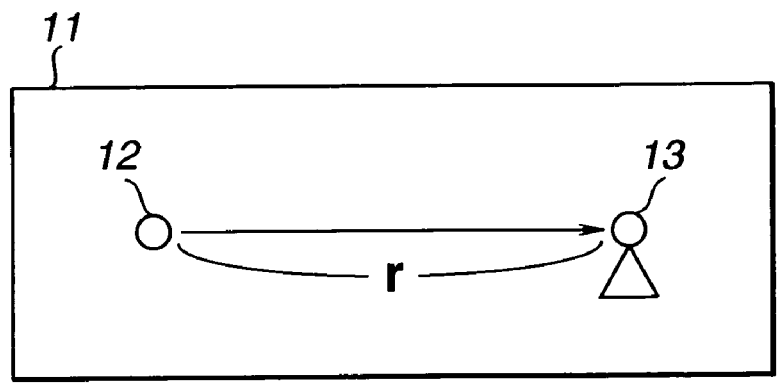
FIG. 15 is a diagram explaining audio simulation.
Figure 16:
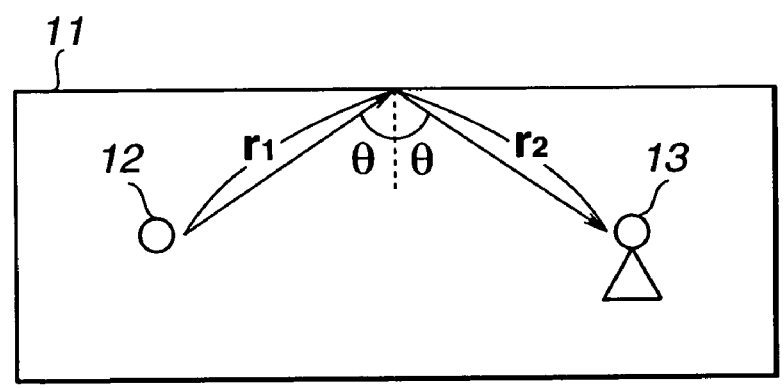
FIG. 16 is a diagram explaining audio simulation.
Figure 17:
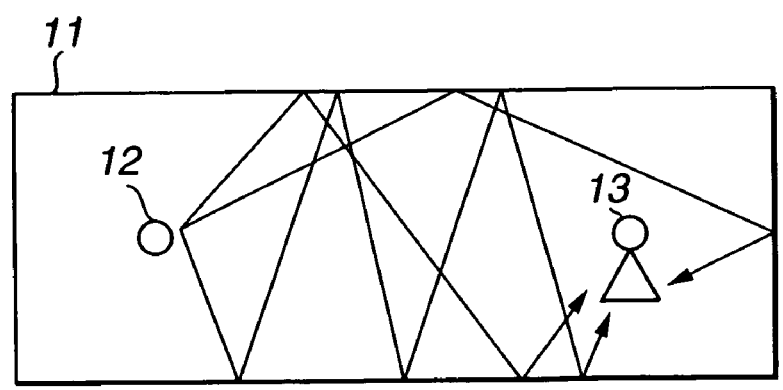
FIG. 17 is a diagram explaining audio simulation.

As an operational subject of audio simulation, there is the attenuation of sound. Attenuation of sound is caused by distance, as well as by the absorption, reflection, and refraction of audio energy. For example, depending on the material of the reflecting surface, audio energy will not only be reflected, but also absorbed. When the sound field space is air, the absorptivity (attenuation of sound) of audio energy is determined by the humidity and temperature of air, and the frequency of sound. Moreover, there are various other factors for the attenuation of sound. Thus, audio simulation performed by the sound processor 3 is divided into direct sound, primary reflected sound, high-order reflected sound, and operation is independently performed thereto. A direct sound, as shown in FIG. 15, is sound generated from the sound source object 12 that directly reaches the sound-receiving point 13 without reflecting on the spatial object 11. Although audio simulation of a direct sound is operated based on the propagation distance r in principle, consideration is also given to the attenuation of sound influenced by the medium of the spatial object (e.g., attenuation determined per frequency of sound such as the temperature, humidity, material, etc. of the sound field space) Moreover, even when the sound source object 12 and the sound receiving point 13 do not exist in the same spatial object and it is not possible connect them with a straight line, as described later, a relay point is provided at the joint face of the spatial object, and the direct sound is calculated from the propagation path connecting the sound source object 12 and the sound-receiving point 13 via the relay point. The detailed description of audio simulation of the direct sound is described later. A primary reflected sound, as shown in FIG. 16, is sound generated from the sound source object 12 that reaches the sound-receiving point 13 upon reflecting on the spatial object 11 once. Audio simulation of the primary reflected sound includes attenuation pursuant to propagation distance $r_1+r_2$, influence caused by the medium of the spatial object, and attenuation pursuant to reflection. Attenuation by reflection is operated based on the reflectance preset to the respective faces composing the spatial object. The detailed description of audio simulation of the primary reflected sound is explained later. A high-order reflected sound, as shown in FIG. 17, is sound generated from the sound source object 12 that reaches the sound-receiving point 13 upon reflecting on the spatial object 11 two or more times. Audio simulation for this type of high-order reflected sound (reverberation) has been studied intensely heretofore in terms of acoustic engineering and, for example, used may be the signal processing technology employed in digital music synthesizers as disclosed in Japanese Patent Laid-Open Publication No. Sho 63-40199. The detailed description of audio simulation of the high-order reflected sound is explained later.

(Audio Simulation of Direct Sound)

Figure 18:
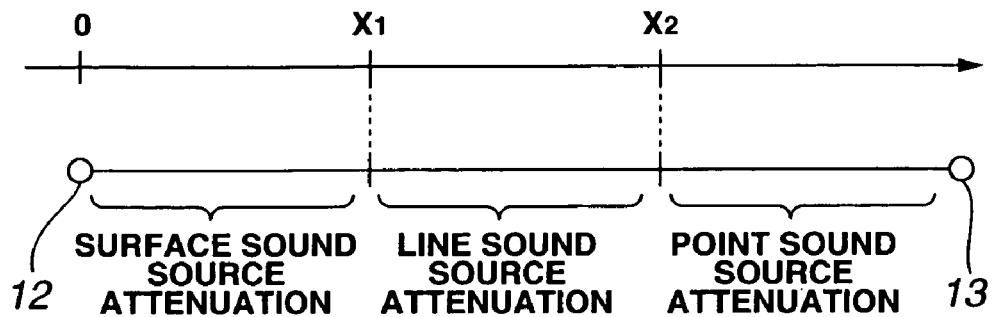
FIG. 18 is a diagram explaining audio simulation.

Audio simulation method of a direct sound is now explained with reference to FIG. 18 and FIG. 20. As causes of sound attenuation regarding a direct sound, as mentioned above, consideration is given to attenuation pursuant to the propagation distance of sound and influence due to the medium of the spatial object. Attenuation pursuant to the propagation distance of sound is examined as follows. As shown in FIG. 18, the sound source object having a finite size may be treated as a face sound source, line sound source, and point sound source, respectively, in accordance with the distance x between the sound source object 12 and the sound-receiving point 13. For example, the sound source object will be considered a face sound source when the sound-receiving point 13 is at a distance of $0<x \leq x_1$ to the sound source object, a line sound source at a distance of $x_1<x \leq x_2$, and a point sound source at a distance of $x_2<x$. A face sound source is a sound source having no attenuation due to distance, and the line sound source and point sound source are sound sources having an attenuation coefficient shown with the following formulas:

$$10 \log_{10} (r_2/r_1) \quad (1)$$

$$20 \log_{10} (r_2/r_1) \quad (2)$$

In the aforementioned formulas, the attenuation coefficient of sound is operated in formula (1) for a line sound source when the distance to the sound-receiving point changes from $r_1$ to $r_2$, and the attenuation coefficient of sound is operated in formula (2) for a point sound source when the distance to the sound-receiving point changes from $r_1$ to $r_2$. Nevertheless, aforementioned $x_1$ and $x_2$ are constants determined by the size of the sound source object. As mentioned above, if the size of the sound source object and the distance between the sound source object and the sound-receiving point are known, the attenuation operation pursuant to the propagation distance of sound is possible. Specifically, such operation may be performed based on the coordinate data and shape data of the sound source object and the coordinate data of the sound-receiving point. For example, if the size of the sound source object is sufficiently small in comparison to the aforementioned propagation distance, the sound source object may be treated as a point sound source.

Next, examined is attenuation pursuant to the medium of the spatial object to which sound is transmitted. Generally speaking, if the sound pressure of a certain datum point is set to $P_0$, and the sound pressure of a point separated from such datum point at a propagation distance of r is set to P, the relationship shown with the formula below is realized:

$$P=P_0 \exp(-mr) \quad (3)$$

Here, m is the attenuation coefficient, and is a constant determined pursuant to medium parameters such as the type, humidity, temperature, etc. of the medium set within the spatial object as well as the frequency of sound generated from the sound source object. FIG. 20 is a table compiling the attenuation coefficient of sounds, in [dB/100 m] units, at the respective temperatures (−10° C., 0° C., 10° C., 20° C.) and the respective humidity percentages (30%, 50%, 70%, 90%) set within the spatial object regarding the respective frequencies (500 Hz, 1000 Hz, 2000 Hz, 4000 Hz, 5940 Hz) of sounds generated from the sound source object. By priorly registering to the sound memory the attenuation coefficient of sounds per prescribed unit distance based on the frequencies of sounds generated from the sound source object and the temperature and humidity set to the spatial object, attenuation pursuant to mediums may be obtained from the propagation distance r. Further, as mediums of the spatial object; water, soil, sand, clay, etc. other than air may be set as the arbitrary transmission medium of sounds. Here, the attenuation coefficient of sounds may be determined upon suitably setting the aforementioned various conditions (temperature, humidity, frequency of sound, etc.) for the respective mediums.

(Audio Simulation of Primary Reflective Sound)

Figure 19:
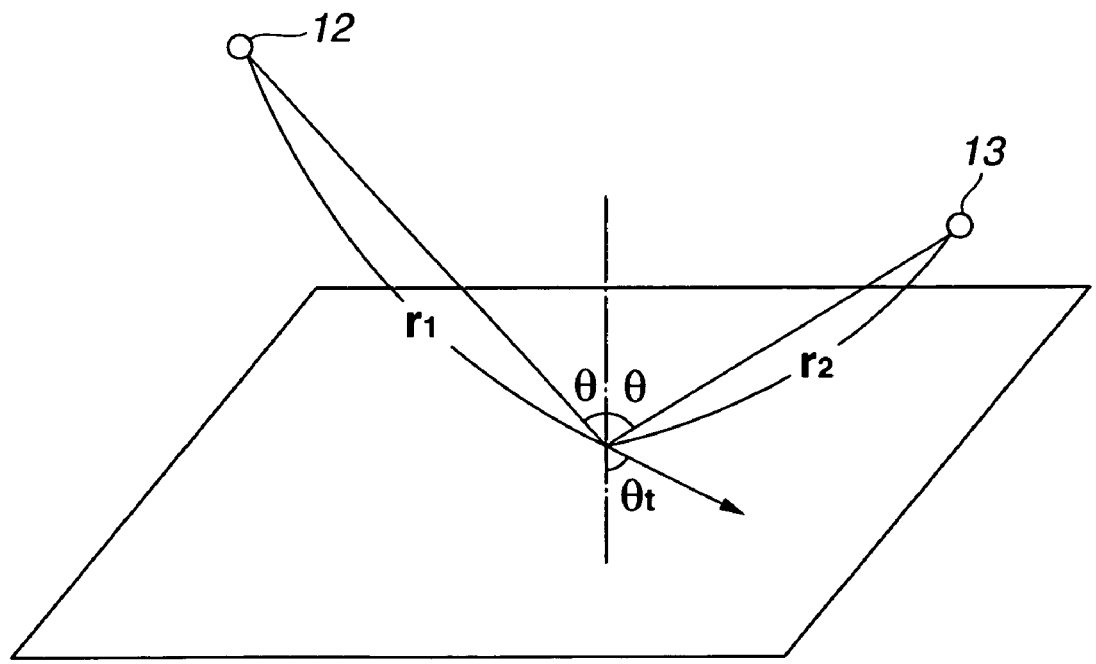
FIG. 19 is a diagram explaining audio simulation.

Next, audio simulation method of a primary reflected sound is explained with reference to FIG. 19. As causes of sound attenuation regarding a primary reflected sound, as mentioned above, consideration is given to attenuation pursuant to the propagation distance of sound and influence due to the medium of the spatial object. Such causes shall be operated similarly as with the direct sound. Here, attenuation pursuant to the reflection of sound is examined. The propagation path of sound pursuant to a primary reflection is, as shown in FIG. 19, calculated geometrically until the incidence angle and reflecting angle become equal pursuant to the coordinates of the sound source object 12, coordinates of the sound-receiving point 13, and direction, position, etc. of the respective faces composing the spatial object. When the incidence angle and reflecting angle are θ, refraction angle is θt, and the reflectance at the reflecting face is y, the following formulas are known to be satisfied:

$$\gamma=(\delta_1/\delta_2)^2 \quad (4)$$

$$\delta_1=\rho_i c_i \cos \theta - \rho_t c_t \cos\theta_t \quad (5)$$

$$\delta_2=\rho_t c_i \cos \theta_t + \rho_i c_t \cos \theta \quad (6)$$

Here, $c_i$ and $c_t$ are respectively the incident sound speed and refractive sound speed, θ and $θ_t$ are respectively the incidence angle (=reflection angle) and refraction angle, and $ρ_i$ and $ρ_t$ are respectively the medium density of the incident sound area and medium density of the refractive sound area. From the aforementioned formulas, the reflectance γ can be calculated from the sound speed and medium density of the incident sound area and the refractive sound area. This reflecting face is a boundary face of two or more differing types of mediums; for instance, the boundary face of air and water, the boundary face of air and wall, etc. The reflection, transmission, refraction, and the like of the incident sound are determined pursuant to the degree of this reflectance. The attenuation of sound pursuant to the propagation distance can be obtained from $r_1+r_2$, and the attenuation due to mediums can be obtained from the medium parameters and sound frequencies set for each spatial object.

(Audio Simulation of High-Order Reflected Sound)

Audio simulation method of a high-order reflected sound is now explained. As mentioned above, a vast operation is required in order to accurately simulate high-order reflected sound (reverberation). Thus, the high-order reflected sound is also examined upon dividing the attenuation of sound into attenuation pursuant to propagation distance, attenuation pursuant to mediums, and attenuation pursuant to reflection. Attenuation due to distance depends on the size of the modeled spatial object, attenuation due to mediums depends on medium parameters and sound frequencies, and attenuation due to reflection depends on reflection coefficients. Although the various types of attenuation above may be operated by the aforementioned methods, the following method is adopted in order to simplify the operation further. When the spatial object is a rectangular parallelepiped, the ridgelines composing such rectangular parallelepiped may be reduced to the xyz axis directions defined in the virtual three-dimensional space. Thus, components of the high-order reflected sound are reduced to x axis direction, y axis direction, and z axis direction, simulation of high-order reflected sound is performed for the respective components, and finally synthesized thereafter. Particularly, used may be audio simulation technology performed based on a transmission function of an audio transmission system calculated pursuant to an impulse response; for instance, signal processing technology employed in digital music synthesizers or technology for reproducing sound fields of concert halls as disclosed in Japanese Patent Laid-Open Publication No. Sho 63-40199, or reverb signal processing technology generally used in audio engineering.

(Composition of Sound Processor)

Figure 2:
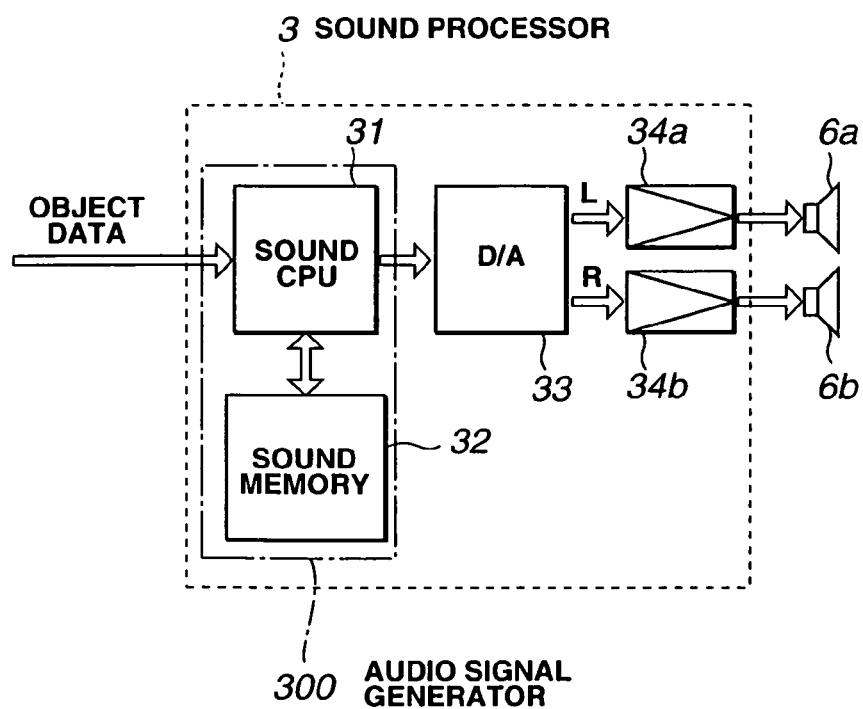
FIG. 2 is a hardware block diagram of the sound processor.

FIG. 2 shows the composition of the sound processor 3. The sound processor 3 comprises a sound CPU 31, sound memory 32, D/A converter 33, amplifiers 34a and 34b, and speakers 6a and 6b. As mentioned above, object data (information on the position, size, direction, shape, etc. of the respective objects necessary for drawing pictures of the virtual three-dimensional space on the screen) is supplied from the main CPU 1 to the sound CPU 31. The sound CPU 31 forms the audio transmission system of sound field spaces subject to audio simulation based on such object data. Specifically, audio simulation is performed pursuant to the position, size, direction, sound type of the sound source object set in the virtual three-dimensional space based on object data; the position, direction, etc. of the sound-receiving point; and the environment surrounding such sound source object and sound-receiving point (information regarding buildings, trees, and other objects positioned therebetween). This audio simulation is performed for direct sounds, primary reflected sounds, high-order reflected sounds, and these sounds are synthesized in the end. Written to the sound memory 32 is information regarding the coordinates of the spatial object forming the sound field space, medium parameters, position of the sound source object, position of the sound-receiving point, etc., and this sound memory 32 functions as the work area upon audio simulation. Moreover, priorly registered to the sound memory 32 is waveform data (PCM-coded audio signals) and so on set for each sound source object.

(Audio Signal Processing in Audio Signal Generator)

Figure 8:
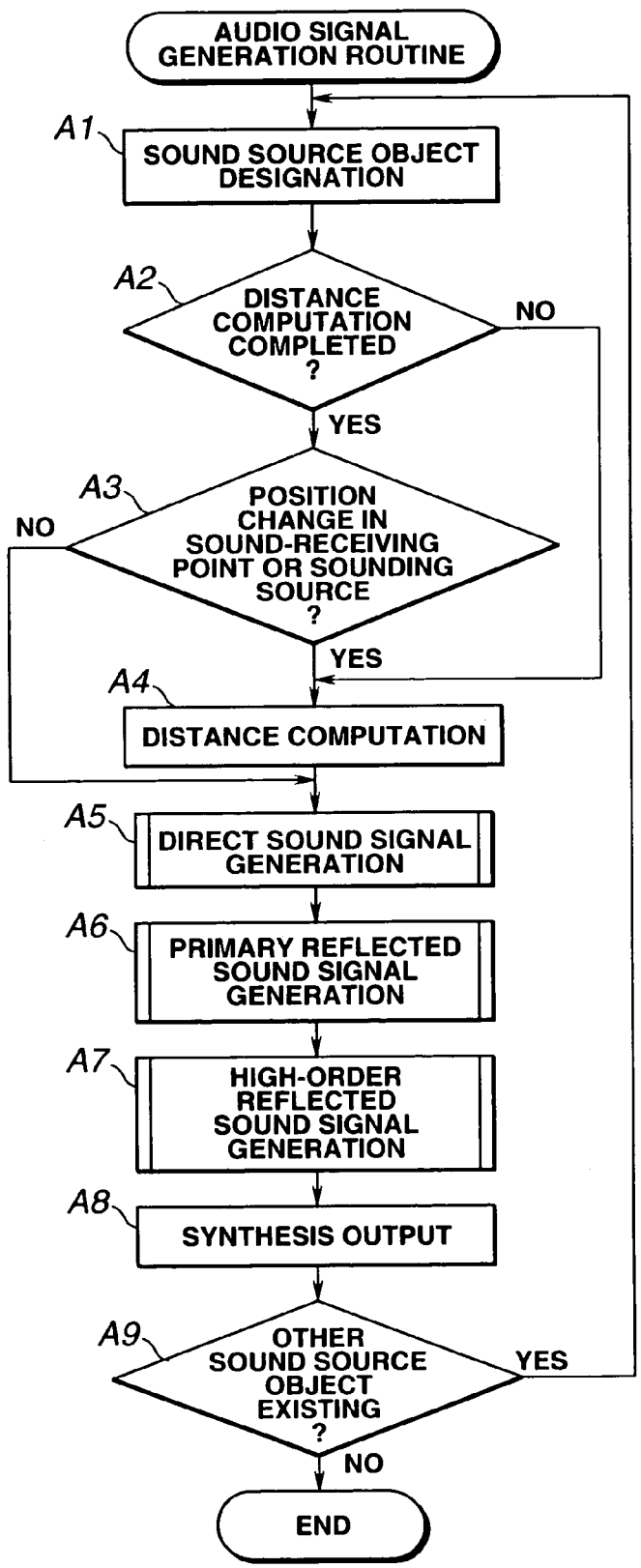
FIG. 8 is a flowchart of the audio signal generation routine.

The block composed of the sound CPU 31 and sound memory 32 is referred to as an audio signal generator 300, and the processing steps in the audio simulation performed by such audio signal generator 300 are explained below. FIG. 8 is a flowchart of the audio signal generation routine performed during audio simulation. Foremost, a sound source object subject to audio simulation is designated based on object data (step A1). If a plurality of sound source objects exist, they are designated one by one and the present routine is executed for each sound source object. Although the method of designating the sound source object is arbitrary, if the sound generated from the sound source object shows a fixed level of output decrease at the sound-receiving point or shows a fixed level of output difference in comparison to the sound generated from another sound source object, such sound source object is not designated and the audio signal generation routine is not executed. Thus, by omitting needless operations as above, the operational load of audio simulation is decreased. This point will be described in detail later.

Next, whether the distance between the sound source object and the sound-receiving point has been calculated is judged (step A2). Generally, the sound source object and the sound-receiving point are not necessarily fixed within the virtual three-dimensional space, and there may be cases when they are moving. In consideration of such circumstances, if the distance between the sound source object and the sound-receiving point does not change, the value of the distance used in the previous audio signal generation routine may be utilized. Meanwhile, when the distance between the sound source object and the sound-receiving point has not yet been computed, or, when the distance between the sound source object and the sound-receiving point changes, such distance must be newly calculated. Thus, when the distance between the sound source object and the sound-receiving point has not yet been computed (step A2: NO), or, when the distance between the sound source object and the sound-receiving point changes (step A3: YES), the distance between the sound source object and the sound-receiving point is computed (step A4). This distance is directly utilized in audio simulation of the direct sound. Simultaneously in this step, the path of the primary reflected sound is operated, and the propagation distance of the primary reflected sound is computed.

(Alteration of Sound Source Frequencies by Memory Operation)

Figure 21:
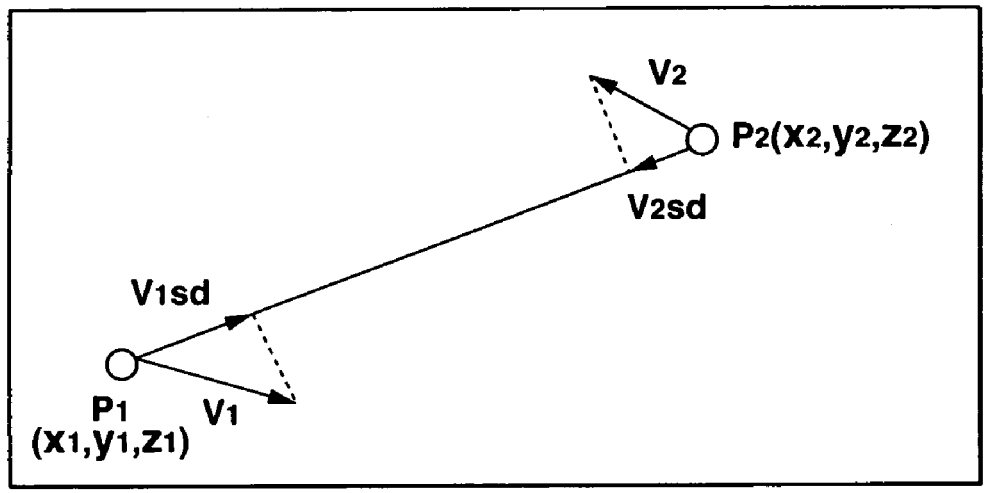
FIG. 21 is a diagram explaining the Doppler effect.

Then, after the processing at step A4, the routine proceeds to step A5 and step A6. Nevertheless, in such steps A5 and A6, in consideration of the influence of the Doppler effect due to the movement of the sound source object or the sound-receiving point, memory operation is performed in order to alter the frequency (sound source frequency) of sounds generated from the sound source object. Memory operation is a method of altering the sound source frequency pursuant to the Doppler effect upon obtaining, from the distance between the sound source object and the listening position, the write address on the delay memory of the waveform data of sounds generated from the sound source. As a matter of common knowledge regarding the Doppler effect, as shown in FIG. 21, upon setting the coordinates of the sound source object as $P_1$ ($x_1$, $y_1$, $z_1$), the movement speed as $V_1$, coordinates of the sound-receiving point as $P_2(x_2, y_2, z_2)$, the movement speed as $V_2$, the projective components to $P_1P_2$ of speed $V_1$ as $V_{1Sd}$, and the projective components to $P_1P_2$ of speed $V_2$ as $V_{2sd}$, the frequency f' of the sound heard at the sound-receiving point $P_2$ can be represented by the following formula:

$$f'/f=(c+V_{2sd})/(c-V_{1sd}) \qquad (7)$$

Figure 23:
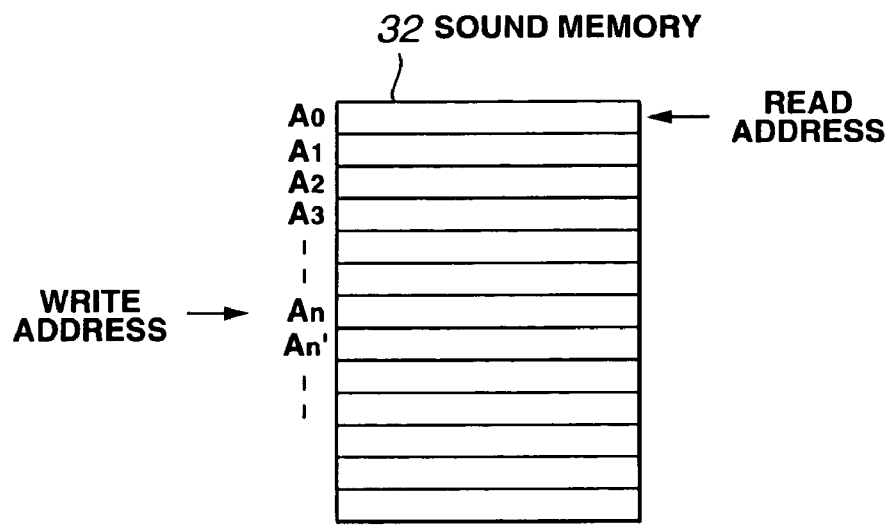
FIG. 23 is a diagram explaining the memory operation.

Here, c is the speed of sound characteristic to the medium of the spatial object, and f is the sound source frequency. Although frequency f' can be obtained from formula (7) above, here, explained is the calculation of frequency f' with memory operation based on physical analysis. The sound CPU 31 decides the waveform data address to be written to the sound memory 32a based on the distance between the sound source object and the listening position obtained at step A4. For example, as shown in FIG. 23, the write commencement address of waveform data is set as $A_n$. Meanwhile, the read commencement address of waveform data is set as $A_0$. Here, the difference between the write address and the read address ($A_n$–$A_0$) corresponds to the distance between the sound source object and the listening position. The sound CPU 31 reads waveform data for each predetermined unit of time (predetermined fixed value) in the order of address $A_0$, $A_1$, . . . . In other words, waveform data is output from the memory in the order of address $A_0$, $A_1$, . . . . Waveform data is written in address $A_n$ corresponding to the distance between the sound source object and the listening position.

Figure 24:
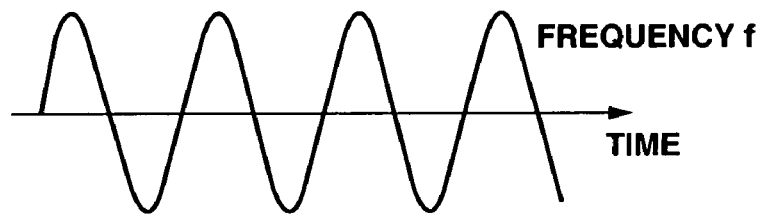
FIG. 24 is a diagram explaining the memory operation.
Figure 25:
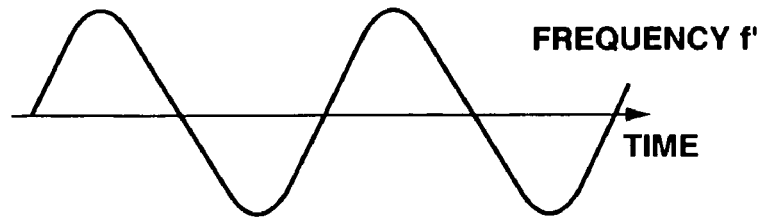
FIG. 25 is a diagram explaining the memory operation.

By setting the write commencement address and read commencement address of the waveform data as described above, waveform data of the sound source frequency f shown in FIG. 24 is read as waveform data of frequency f' as shown in FIG. 25.

For example, when the sound source object is moving in a direction away from the listening position, write address $A_n'$ becomes a larger value than address $A_n$. Here, write address $A_n'$ writes waveform data computed from a predetermined interpolation operation pursuant to the respective waveform data of previous waveform data (e.g., waveform data of preceding address $A_{n-1}$) and such address $A_n'$. Therefore, the waveform read for each predetermined unit of time becomes the waveform as shown in FIG. 25. Further, when the distance between the sound source object and the listening point does not change, the write address becomes $A_n, A_{n+1}, A_{n+2}, \ldots$ with respect to read address $A_0, A_1, A_2, \ldots$ and, thus, the Doppler effect is not produced.

Figure 22:
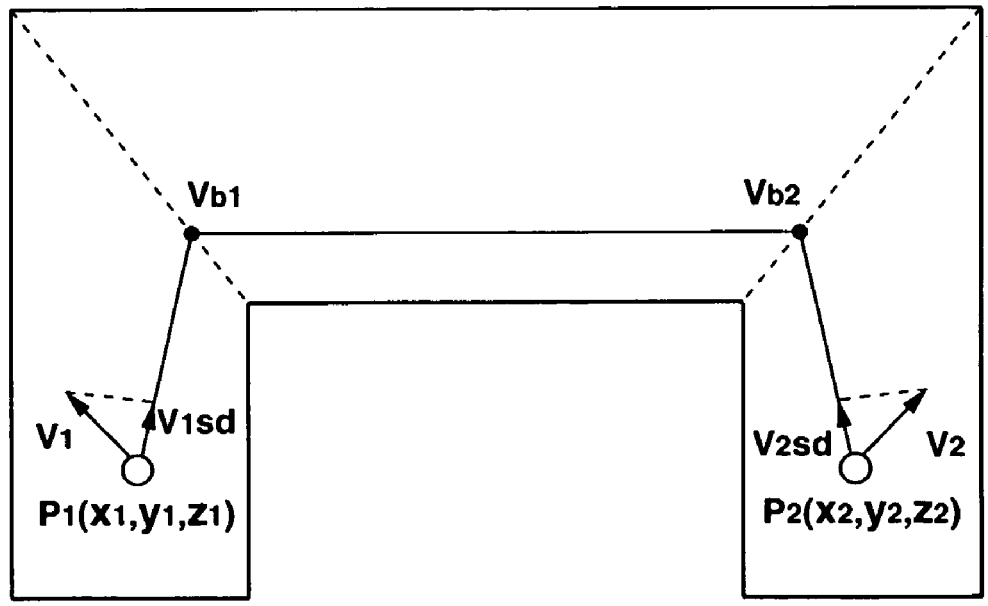
FIG. 22 is a diagram explaining the Doppler effect.

Moreover, even if the sound source object or the sound-receiving point is moving relatively, as shown in FIG. 22, if they may not be connected with a straight line, relay points $P_{b1}$ and $P_{b2}$ are adequately set, and the distance between the sound source object and the listening position is obtained. Then, the write address of the waveform data is set based on such obtained value and the sound source frequency is altered thereby.

The alteration of this sound source frequency is processed during the direct sound signal generation at step A5 and the primary reflected sound signal generation at step A6.

(Direct Sound Signal Generation Step)

Figure 9:
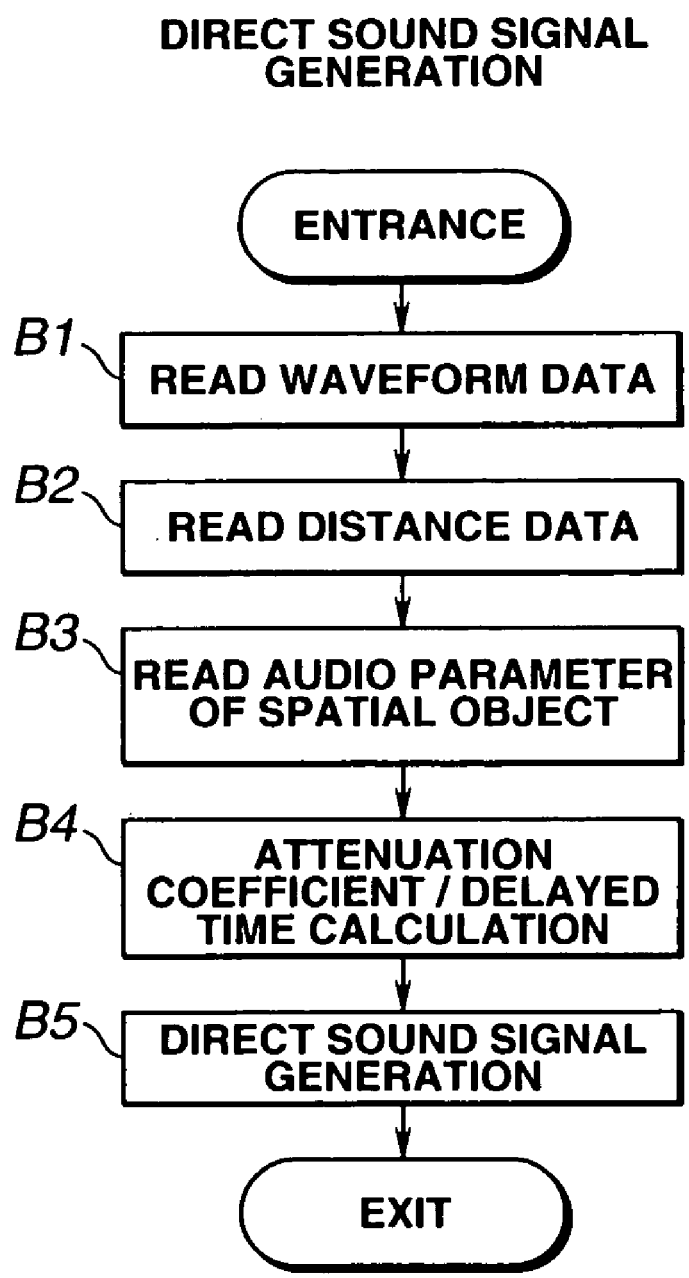
FIG. 9 is a flowchart showing the steps of direct sound signal generation.

The direct sound signal generation step at step A5 is now explained with reference to FIG. 9. Foremost, waveform data assigned per sound source object is read from the sound memory 32 (step B1). Next, distance data computed at step A4 is read (step B2). The distance data read at this step is the distance between the sound source object and the sound-receiving point. Then, audio parameters of the sound source object are read from the sound memory 32 (step B3), and the attenuation factor of the direct sound is operated utilizing formulas (1) to (3) above (step B4). Moreover, the propagation delay time of the direct sound is operated at this step. The propagation delay time t can be represented by the formula below when the speed of sound of the spatial object is set as c and the propagation distance of sound is set as d:

$$t = d/c \qquad (8)$$

Attenuation processing is performed to waveform data of the sound source object based on the operational results of these processing steps, and direct sound signals are generated pursuant to delay processing (i.e., alteration processing of sound source frequencies pursuant to the aforementioned memory operation) (step B5).

In the aforementioned direct sound signal generation step, explained was a situation where the sound source object and the sound-receiving point exist within a single spatial object. Nevertheless, as shown in FIG. 26, when a sound source object $P_1$ and a sound-receiving point $P_2$ extend over two or more spatial objects, the processing described below is performed.

Figure 26:
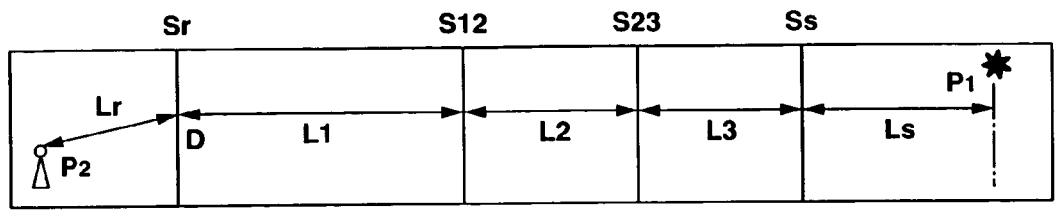
FIG. 26 is a diagram explaining audio simulation.
Figure 27:
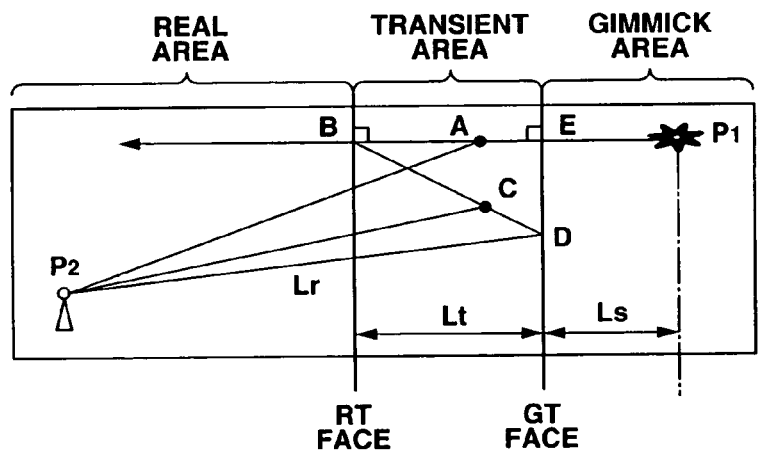
FIG. 27 is a diagram explaining audio simulation.

Referring to FIG. 26, when the sound source object $P_1$ and the sound-receiving point $P_2$ extend over a plurality of spatial objects, the distance $P_1P_2$ between $P_1$ and $P_2$ can be approximated with formula (9) below:

$$P_1P_2 = Lr + Ls + \Sigma Lx \qquad (9)$$

Here, Lr is the distance between the sound-receiving point $P_2$ and an appropriate point (middle point for example) on the joint face Sr with the adjacent spatial object, Ls is the shortest distance from the sound source object $P_1$ to the joint face Ss with the adjacent spatial object, and Lx is an audio transmission distance characteristic to a plurality of spatial objects in between the spatial objects in which $P_1$ and $P_2$ exist and, in FIG. 26, correspond to L1, L2, and L3. Thereby, even if a plurality of spatial objects are arranged in complexity as in FIG. 31, distances maybe computed with simple operations. Further, even if a sound source object moves to another spatial object, the distance thereof and changes in the direction of the sound source object seen from the sound-receiving point will be continuous.

Meanwhile, when the sound source object $P_1$ and the sound-receiving point $P_2$ are at a distance sufficiently near each other, this distance cannot be approximated with formula (9). The operational method to be performed in such case is described below. Suppose that the sound source object $P_1$ in FIG. 26 is moving from point E to point A to point B. Here, the area in which the distance $P_1P_2$ between the sound source object $P_1$ and the sound-receiving point $P_2$ can be expressed with formula (9) is referred to as the gimmick area, the area which can be expressed with a distance between two geometrical points is referred to as the real area, and the area therebetween is referred to as the transient area. The boundary face of the gimmick area and the transit area is referred to as the GT face, and the boundary face of the real area and the transient area is referred to as the RT face. The formula for obtaining the distance between the sound source object $P_1$ and the sound-receiving point $P_2$ when the sound source object $P_1$ exists in the gimmick area is, pursuant to formula (9):

$$P_1P_2 = Lr + Ls \qquad (10)$$

When the sound source object $P_1$ exists in the real area, $P_1P_2$ is expressed with the distance between the two points. When the sound source object $P_1$ exists at point A in the transient area, $P_1P_2$ is obtained as follows.

Figure 28:
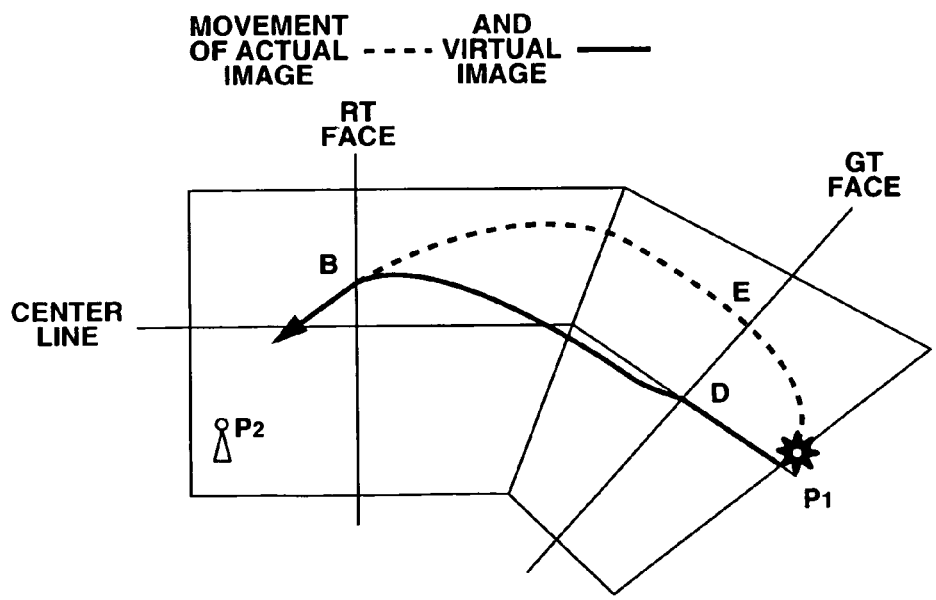
FIG. 28 is a diagram explaining audio simulation.

Sought is point C which interiorly divides segment DB such that the ratio thereof becomes the same ratio as that of the length AE of the perpendicular line from point A to the GT face and the length AB of the perpendicular line from point A to the RT face. Here, point D is an appropriate point (middle point for example) on the GT face. According to the above, even if the sound source object $P_1$ moves from the gimmick area to the real area via the transient area, changes in the distance $P_1P_2$ from the sound-receiving point will be continuous. Likewise, the same can be said if the sound source object $P_1$ moves from the real area to the gimmick area via the transient area. With this method, even if the spatial object is connected non-linearly as shown in FIG. 28, changes in the distance between the sound source object and the listening point and in the direction of the sound source object seen from the sound-receiving point will be continuous. That is, if the sound source object $P_1$ moves along the dotted line in FIG. 28, the distance between the sound source object and the listening point will be operated as though the sound source object $P_1$ is moving along the path shown in a solid line.

Contrarily, regarding the attenuation of sound when a sound propagates a plurality of spatial objects, consideration must be given severally pursuant to the distance between the sound-receiving point and the sound source object, the shape of the spatial object (city, tunnel, etc.), the connective state thereof, and so on.

(Primary Reflected Sound Signal Generation Step)

Figure 10:
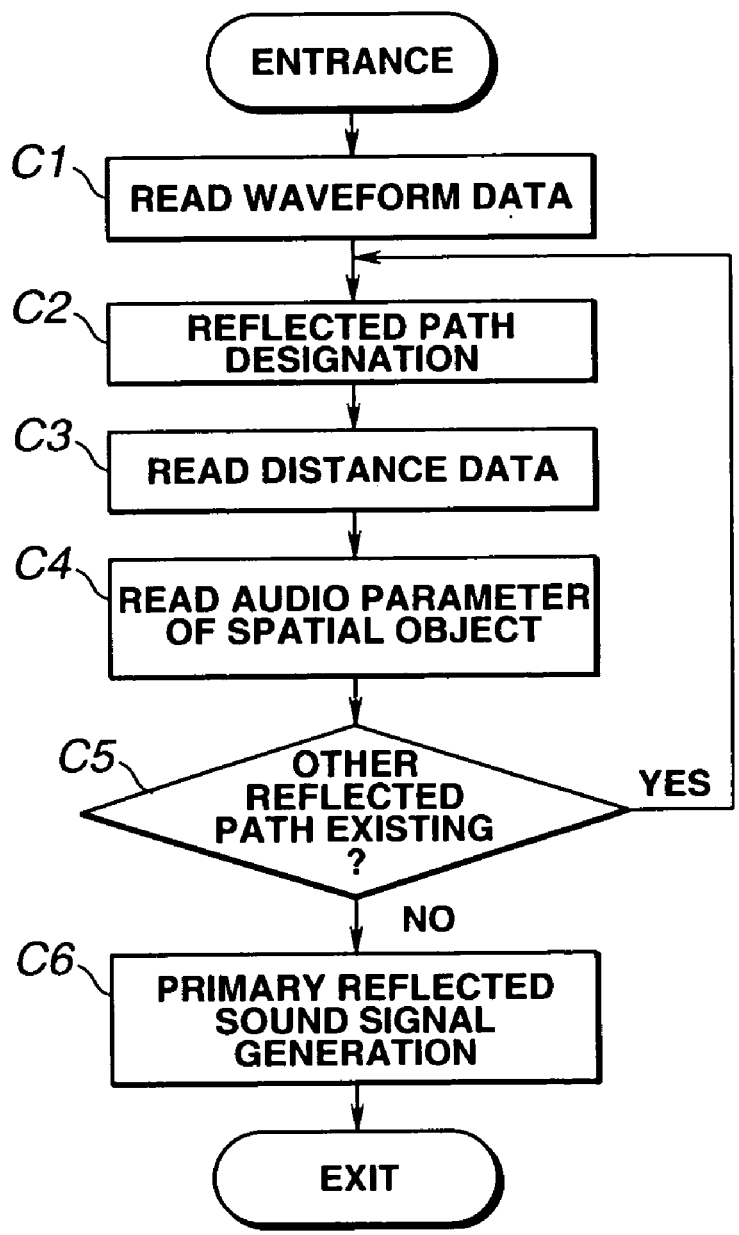
FIG. 10 is a flowchart showing the steps of primary reflected sound signal generation.

The primary reflected sound signal generation step at step A6 is explained in detail with reference to FIG. 10. Foremost, the sound CPU 31 reads waveform data assigned per sound source object from the sound memory 32 (step C1). Then, the sound CPU 31 designates an arbitrary primary reflection path among a plurality of primary reflection paths existing in the spatial object (step C2). For example, if there are four reflecting surfaces in the spatial object, four primary reflection paths also exist, and thus, the respective primary reflection paths are successively designated, and the sound CPU 31 performs the following processing steps. Next, distance data of the primary reflection path designated at this step is read (step C3). This distance data corresponds to $r_1+r_2$ in FIG. 19. Then, audio parameters (medium parameter, reflection parameter) of the spatial object are read (step C4). The aforementioned processing steps are performed for the remaining primary reflection paths (step C5), attenuation/delay processing is performed to all primary reflection paths pursuant to the propagation distance, medium parameter, and reflection parameter, thereby generating the primary reflected sound.

(High-Order Reflected Sound Signal Generation Step)

Figure 4:
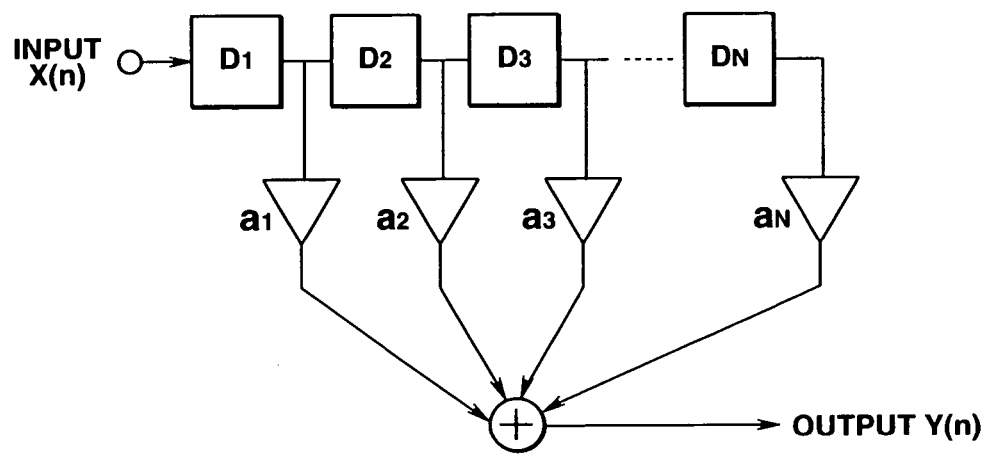
FIG. 4 is a high-order reflected sound generation filter.

Next, the high-order reflected sound signal generation step at step A7 is explained. A high-order reflected sound may be generated with the FIR filter (high-order reflected sound generation filter) shown in FIG. 4. At step A7, the filter coefficient of this high-order reflected sound generation filter is determined, and high-order reflected sound is generated by processing the waveform with such filter. Here, a filter coefficient shall mean the respective delay times $D_1$, $D_2$, ... $D_N$ and tap coefficients $a_1, a_2, \ldots a_N$ of the high-order reflected sound generation filter. Delay times $D_1, D_2, \ldots D_N$ may be obtained from the propagation distance of the high-order reflected sound and the medium parameter of the spatial object. Tap coefficients $a_1, a_2, \ldots a_N$ are set as an overall attenuation coefficient of the high-order reflected sound in consideration of attenuation due to propagation distance, attenuation due to refection, and attenuation due to mediums, and can be obtained from the propagation distance of the high-order reflected sound, medium parameter of the spatial object, and reflectance of the reflecting surface. In FIG. 4, X(n) is the input signal of the filter; specifically, it corresponds to the waveform data read from the sound memory 32. Y(n) is the output signal of the high-order reflected sound generation filter, and corresponds to the waveform data of the high-order reflected sound. Further, N is the number of paths of the high-order reflected sound existing in the sound field space.

Figure 11:
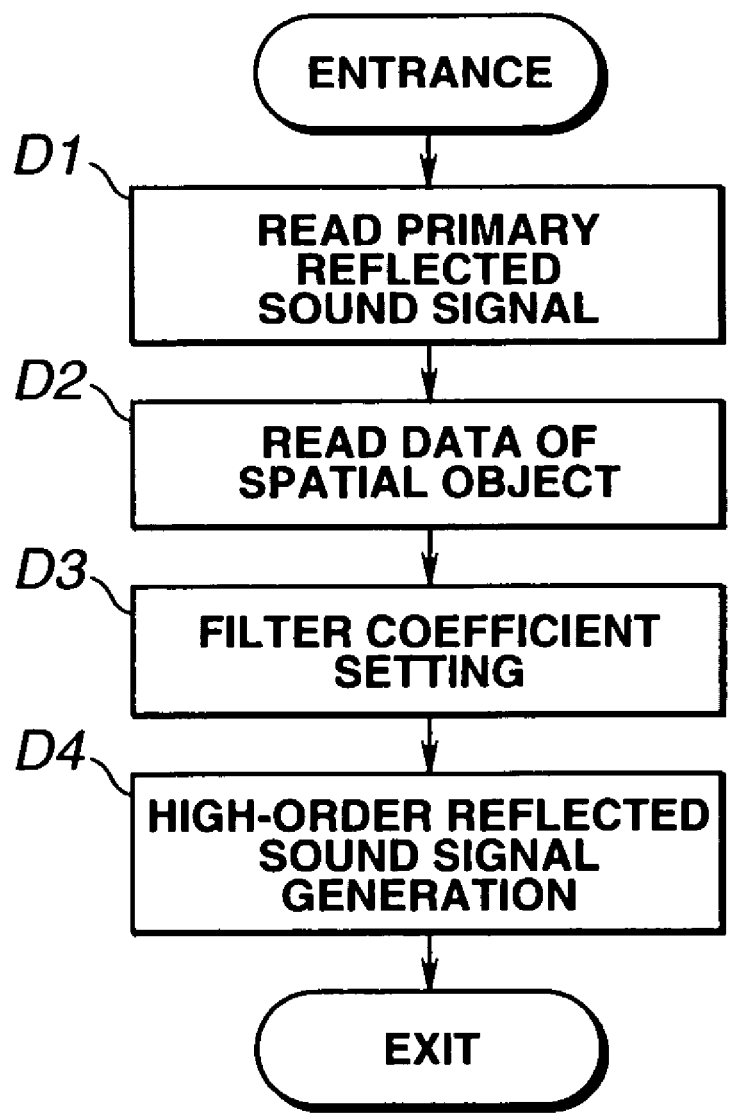
FIG. 11 is a flowchart showing the steps of high-order reflected sound signal generation.

The high-order reflected sound generation step is now explained with reference to FIG. 11. Foremost, the sound CPU 31 reads the primary reflected sound signal X (n) generated at step A6 (step D1). Next, data (coordinates, medium parameter, etc.) of the spatial object is read from the sound memory 32 (step D2). Delay times and attenuation coefficient relying upon the size, medium, etc. of the spatial object are determined from such spatial object data, and filter coefficients of the high-order reflected sound generation filter are obtained (step D3). Finally, signal X(n) read at step D1 is passed through the high-order reflected sound generation filter as an input signal in order to generate high-order reflected sound signal Y(n) (step D4).

Figure 5:
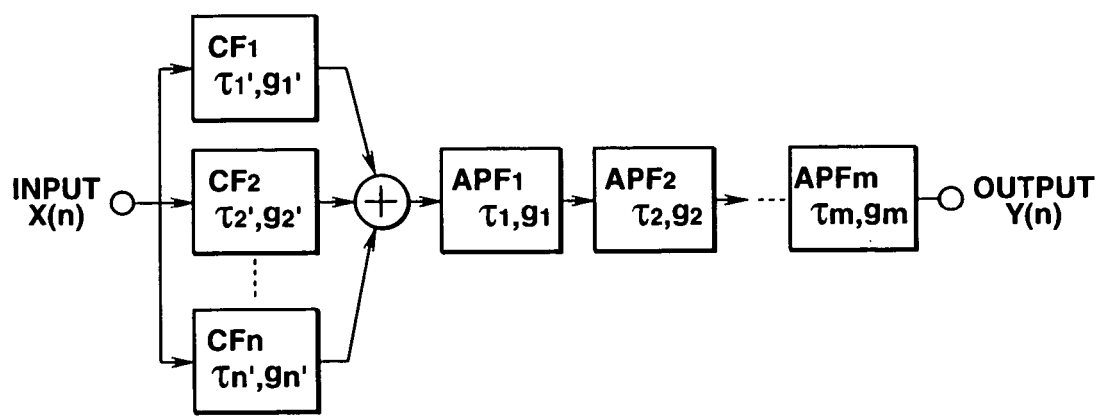
FIG. 5 is a high-order reflected sound generation filter.
Figure 6:
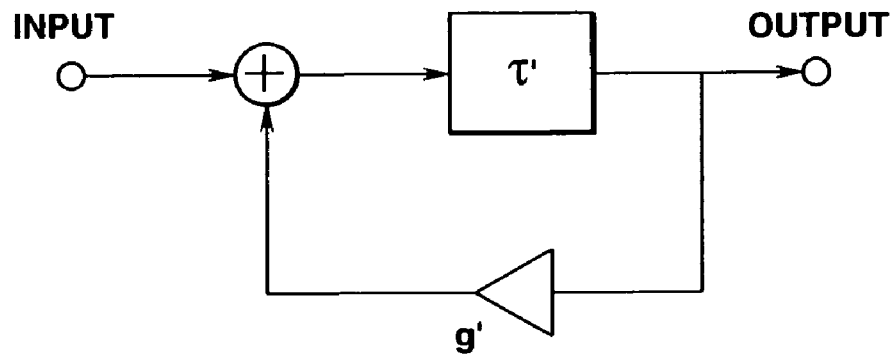
FIG. 6 is a diagram showing a comb filter.
Figure 7:
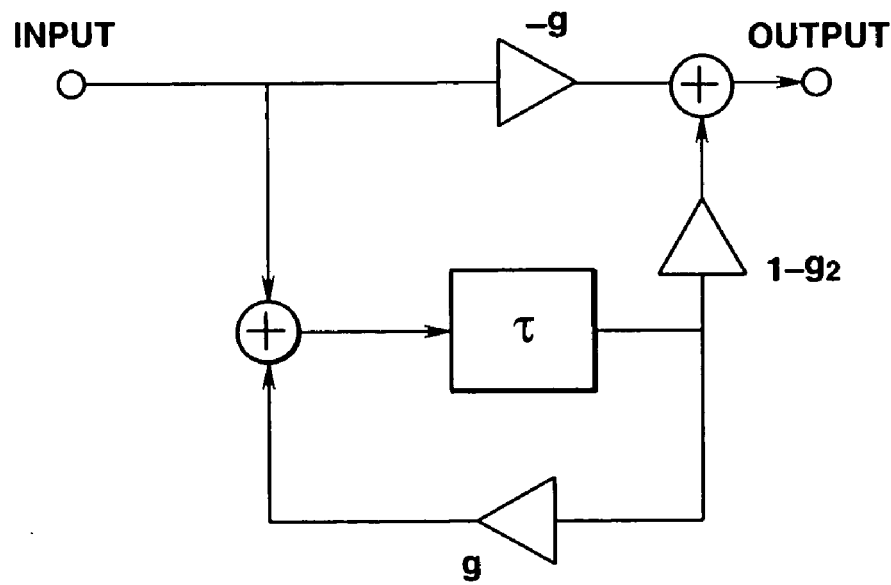
FIG. 7 is a diagram showing an all-pass filter.

The high-order reflected sound generation filter may also be structured as shown in FIG. 5. This filter is composed of n number of comb filters connected in rows ($CF_1$ to $CF_n$), and m number of all-pass filters connected in a cascade ($APF_1$ to $APF_m$). The input signal of this filter is X(n), and is the waveform data obtained at the generation step of the aforementioned primary reflected sound signal. The output signal thereof is Y(n), and is the waveform data of the high-order reflected sound. The comb filter is structured as shown in FIG. 6, and the all-pass filter is structured as shown in FIG. 7. As a result thereof, by adjusting the delay time $\tau'$ and the feedback gain $g'$ of the comb filter and the delay time $\tau$ and the feedback gain $g$ of the all-pass filter, frequency characteristics, reverberation time, etc. may be adjusted. For example, the relationship of the reverberation time T, delay time $\tau$, and feedback gain g in cases of the comb filter and all-pass filter can be represented in the following formula:

$$T = 3\tau/\log|g|^{-1} \tag{11}$$

Here, if the distance between the sound source object and the sound-receiving point is near, the delay time $\tau$ is set low, and feedback gain g is set high. If the distance between the sound source object and the sound-receiving point is far, the delay time $\tau$ is set high. The feedback gain g shall be set high/low in accordance with the sound field space. Accordingly, in the high-order reflected sound signal generation step, high-order reflected sound is generated by determining the filter coefficients $(\tau_1', g_1'), \ldots, (\tau_n', g_n')$ of n number of comb filters and filter coefficients $(\tau_1, g_1), \ldots, (\tau_m, g_m)$ of m number of all-pass filters. Further, in consideration of the operational time of waveform data, a preferable value would be somewhere around n=3 and m=5.

(Expression of Frequency Characteristics by Reflection)

In the aforementioned primary reflected sound generation step or the high-order reflected sound generation step, low-pass filters and high-pass filters are used to express the changes in frequency characteristics caused by reflection to the various objects. For example, when sound reflects off materials such as curtains which absorb high frequency components, a low-pass filter is used since the reflected sound will only be low frequency components. Meanwhile, when sound reflects off materials which absorb low frequency components, a high-pass filter is used such that high frequency components are included in the reflected sound components. Moreover, by utilizing filters, such as a band-pass filter, for specific frequency components, changes in frequency characteristics caused by the reflection of various materials may be expressed.

(Synthesis of Audio Signals)

Referring back to the audio signal generation routine shown in FIG. 8, after the generation of direct sound signals, primary reflected sound signals, and high-order reflected sound signals at steps A5 to step A7, these signals are synthesized and output (step A8). If other sound source objects exist, these series of steps (step A1 to step A8) are executed to such other objects (step A9: YES). If no other sound source object exists (step A9: NO), the audio signal generation routine is ended.

(Logical Composition of Audio Signal Generator)

Figure 3:
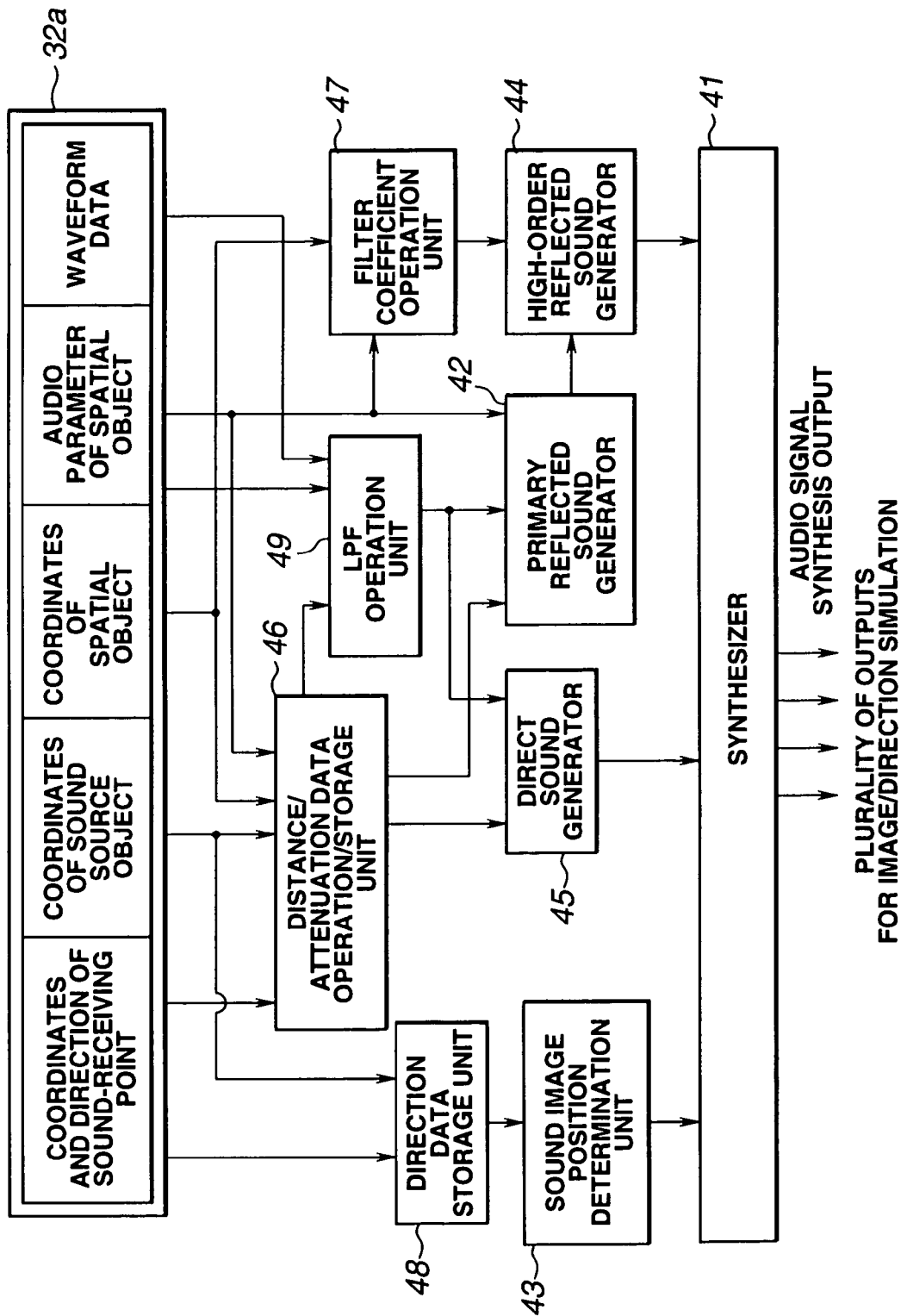
FIG. 3 is a logical structural diagram of the audio signal generator.

The logical composition of the audio signal generator 300 is now explained with reference to FIG. 3. As shown in FIG. 2, the audio signal generator 300 comprises a sound CPU 31 and sound memory 32 as its physical hardware resource. The logical functions of the audio signal generator 300 realized by such hardware resources, as shown in FIG. 3, may be divided into a sound memory 32a (partial work area of the sound memory 32), synthesizer 41, primary reflected sound generator 42, sound image position determination unit 43, high-order reflected sound generator 44, direct sound generator 45, distance/attenuation data operation/storage unit 46, filter coefficient operator 47, direction data storage 48, and LPF operator 49.

The terms "unit" and "means" used in this specification are concepts realized in audio simulation, and do not necessarily correspond one-to-one with a specific hardware or software routine. The same hardware element may realize a plurality of units or means, or the association of a plurality of hardware elements may realize a single unit or means.

Stored in the sound memory 32a are coordinate data of the sound-receiving point, data of the facing direction of the listener, coordinate data of the sound source object, coordinate data of the spatial object, audio parameter of the spatial object, and waveform data of the sound source object. The distance/attenuation data operation/storage unit 46 operates and stores the path length of the direct sound (propagation distance of sound) and the direction thereof, as well as the path length of all primary reflected sounds (propagation distance of sound) and the direction thereof pursuant to coordinate data of the sound-receiving point, coordinate data of the sound source object, and coordinate data of the spatial object. Further, the attenuation caused by the distance, medium, etc. is operated pursuant to such path lengths and the audio parameters of the spatial object. The operational results are supplied to the direct sound generator 45, primary reflected sound generator 42, and LPF 49.

The LPF 49 performs frequency attenuation of sound to the waveform data pursuant to audio parameters of the spatial object and the propagation distance from the distance/attenuation data operation/storage unit 46, and supplies the processing results to the direct sound generator 45 and primary reflected sound generator 42.

Direct sound signals are generated with the direct sound generator 45 performing attenuation/delay processing (step A5) to the waveform data. Primary reflected sound signals are generated with the primary reflected sound generator 42 performing attenuation/delay processing (step A6) to the waveform data.

The panning of sound images is performed with the sound image position determination unit 43. For example, if the speakers for outputting the audio signals are two-channel speakers, the delay time of sound to be output therefrom and the output level thereof are adjusted, and the panning of sound images is thereby conducted. A direction data storage unit 48 is connected to the sound image position determination unit 43, and obtains information for panning sound images from the position/direction of the sound source within the virtual three-dimensional space. The output signals of the sound image position determination unit 43 are supplied to the synthesizer 41. To the high-order reflected sound generation filter 44, the delay time and filter coefficients of the high-order reflected sound generation filter are designated by the filter coefficient operator 47, output signals of the primary reflected sound generator 42 are supplied, attenuation/delay processing is performed (step A7), and high-order reflected sounds are thereby generated. These direct sounds are synthesized with the synthesizer 41, and upon simulating the sound image/direction thereof, two or more outputs are respectively supplied to the relevant D/A converter 33 (FIG. 2).

(Modeling of Objects Composing the Audio Transmission System)

Figure 29:
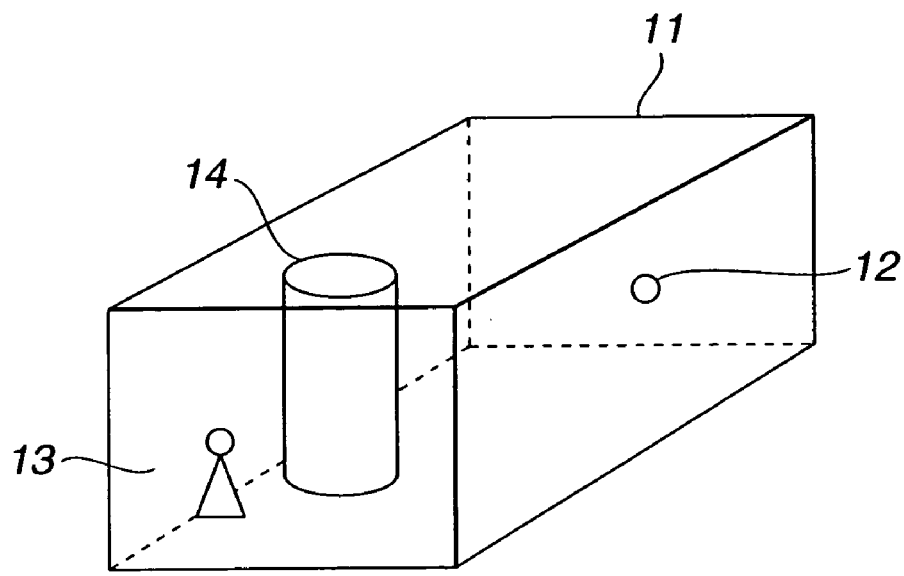
FIG. 29 is a diagram explaining objects being modeled.

Modeling of the objects composing the audio transmission system is now explained with reference to FIG. 29. As shown in FIG. 29, if a sound source object 12, a sound-receiving point 13, and an object 14 having characteristics of reflecting, absorbing, or transmitting sound exist in the spatial object 11, the audio transmission system is composed by the spatial object 11 and the object 14. Thus, although the object 14 is also subject to audio simulation, if primary reflected sounds and high-order reflected sounds were to be generated in consideration of the position, shape, size, etc. of the object 14, the operational load will increase enormously.

Figure 30:
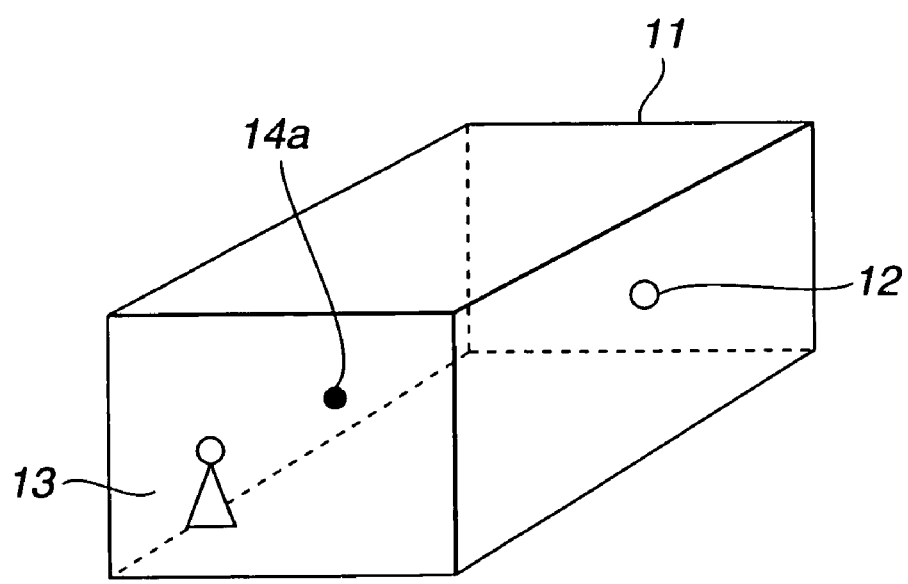
FIG. 30 is a diagram explaining objects being modeled.

Therefore, as shown in FIG. 30, upon audio simulation, the operational load is reduced by handling (modeling) the object 14 composing the audio transmission system as a point 14a having no size, but having characteristics of reflecting, absorbing, or transmitting sound. For example, if the object 14 is an object which absorbs sound, audio simulation is performed by modeling the object 14 as a point 14a having no size and which absorbs sound. Moreover, without limitation to a point, audio simulation can also be conducted by modeling an object as a face. Upon modeling the object as a point or a face, by providing the object 14 composing the audio transmission system with material information such as the position, face direction, reflectance, transmittivity, etc. thereof, not only can the attenuation of sound be simulated, frequency characteristics may also be simulated. Further, the modeling of objects composing the audio transmission system may also be performed to a plurality of objects inside the spatial object.

(Simplification of Audio Simulation)

Simplification of audio simulation is now explained with reference to FIG. 31. When sounds generated from a plurality of sound source objects arrive at the sound-receiving point via a plurality of spatial objects, there may be cases where the attenuation is too large for the sound to be heard at the sound-receiving point. Here, if the sound CPU performs audio simulation for every sound source object, this will be ineffective in consideration of the large operational load, and is inefficient. Thus, if the attenuation of the sound generated from a certain sound source object exceeds a predetermined level (60 dB for example) in comparison to the output level of the sound source object, such sound will be judged as being inaudible. Therefore, the sound. CPU will not perform audio simulation to such sound in order to seek improvement in the overall operational efficiency.

Figure 31:
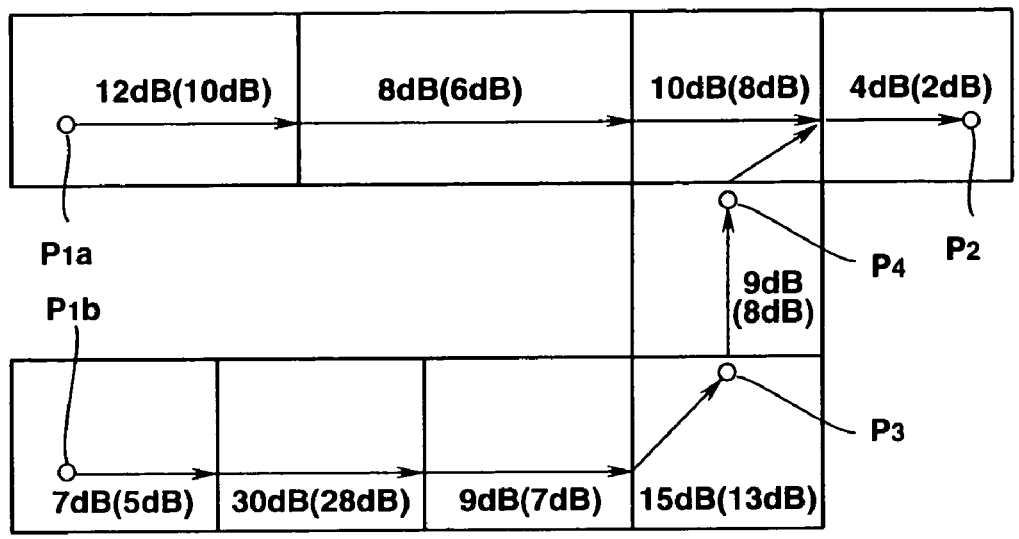
FIG. 31 is a diagram explaining the decrease in the output level of sound due to the propagation distance.

For instance, as shown in FIG. 31, considered is a case where two sound source objects $P_{1a}$ and $P_{1b}$ exist in a sound field space composed of a plurality of spatial objects, and audio simulation is performed at the sound-receiving point $P_2$. In this diagram, 12 dB signifies the attenuation of sound (overall attenuation of the direct sound, primary reflected sound, and high-order reflected sound), and (10 dB) purports the attenuation of only the direct sound. The sound generated from the sound source object $P_{1a}$ has an attenuation of 34 dB at the sound-receiving point $P_2$ (12 dB+8 dB+10 dB+4 dB=34 dB). Therefore, the sound CPU 31 implements audio simulation to the sound source object $P_{1a}$. Meanwhile, the sound generated from the sound source object $P_{1b}$ has an attenuation of 61 dB at the relay point $P_3$ (7 dB+30 dB+9 dB+15 dB=61 dB). Here, as the attenuation at the relay point $P_3$ already exceeds the predetermined level (60 dB), the sound CPU 31 cancels the audio simulation to the sound source object $P_{1b}$. Specifically, in the "designation of sound source object" at step A1 shown in FIG. 8, no designation is made regarding objects wherein the attenuation of sound exceeds the predetermined level, and the successive steps (step A2 to step A8) are canceled. Like this, by omitting operations to sound sources which are ineffective during audio simulation, the operational load of the sound CPU is lightened, and audio simulation is simplified. Further, as a result of being able to realize high-speed operations of audio simulation, dealing with real-time changes in the sound field space is possible.

Upon judging the decrease in the output level of the sound source object, instead of determining the standard attenuation (60 dB for example) after wholly computing the direct sound, primary reflected sound, and high-order reflected sound, it is preferable that the aforementioned standard attenuation be judged from the attenuation of the direct sound alone. This is in consideration of the attenuation of sound being influenced mainly due to the distance in general. For example, audio simulation pursuant to the sound source object $P_{1b}$ is not performed because the attenuation at the relay point P4 of the direct sound generated from the sound source object $P_{1b}$ is 61 dB (5 dB+28 dB+7 dB+13 dB+8 dB=61 dB).

Moreover, as the volume, tone, pitch, etc. of the sound generated from the sound source object will vary, there may be sounds generated in a high volume and there may be those generated in a low volume. If a plurality of sound source objects exist in the sound field space, upon the designation of sound source objects subject to audio simulation at step A1, the output level of other sound source objects and the output level of the sound source object concerned are compared, and judgement is made regarding whether to designate the sound source object concerned. For example, in this diagram, suppose that the output of the direct sound of the sound source $P_{1a}$ is 35 dB smaller than that of the sound source $P_{1b}$. Under this condition, if the decrease in the output level to the receiving-point $P_2$ of the sound source object $P_{1a}$ is converted into the decrease in the output level to the receiving-point $P_2$ of the sound source object $P_{1b}$, the result will be 35 dB+10 dB+6 dB+8 dB+2 dB=61 dB. As a result thereof, audio simulation of the sound source object $P_{1a}$ can be omitted.

Figure 32:
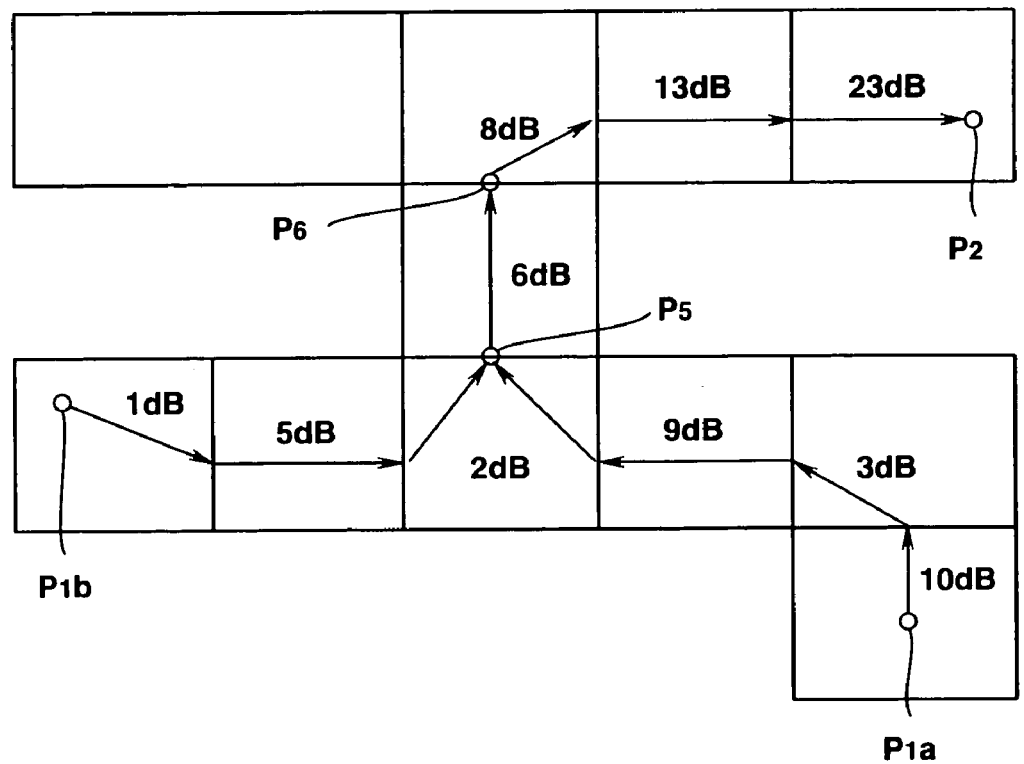
FIG. 32 is a diagram explaining the decrease in the output level of sound due to the propagation distance.
Figure 33:
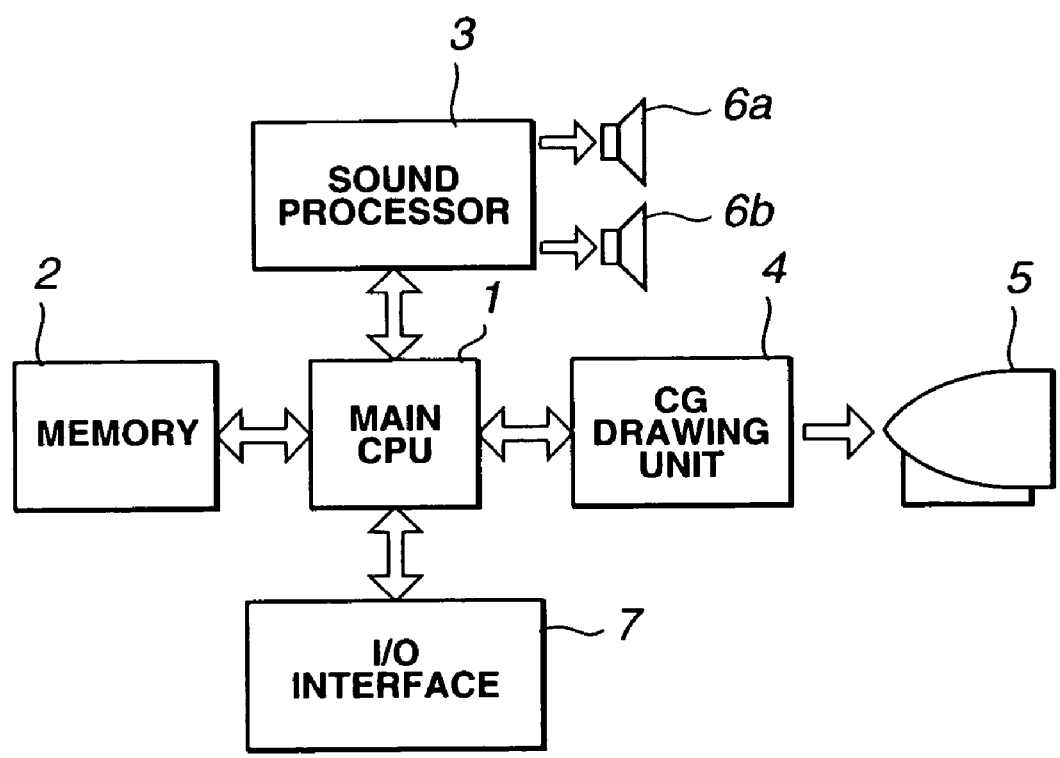
FIG. 33 is a hardware block diagram of a conventional game device.

Further, as shown in FIG. 32, if two sound source objects $P_{1a}$ and $P_{1b}$ exist in the sound field space and the propagation paths of sounds generated from these sound source objects partially overlap with each other, the operational load is lightened by computing the attenuation of sound at the common relay point $P_5$, instead of computing the attenuation from the respective sound source objects. In other words, the attenuation of sound from the common relay point $P_5$ to the sound-receiving point $P_2$ will be 6 dB+8 dB+13 dB+23 dB=50 dB. Therefore, the attenuation of sound from the sound source object $P_{1a}$ to the sound-receiving point $P_2$ will be 1 dB+5 dB+2 dB+50 dB=58 dB. Moreover, the attenuation of sound from the sound source object $P_{1a}$ to the sound-receiving point $P_2$ will be 10 dB+3 dB+9 dB+2 dB+50 dB=74 dB, and this exceeds the standard attenuation (60 dB). Consequently, audio simulation to the sound source object $P_{1b}$ is executed, while audio simulation to the sound source object $P_{1a}$ is cancelled. Like this, when propagation paths of sounds are common, the operational load is lightened by pre-computing the attenuation of sound from the path of the common relay point to the sound-receiving point, instead of operating the attenuation of sound for every sound source.

According to the audio signal processing device of the present invention, as audio simulation is performed upon composing the sound field space with spatial objects, the operational load of audio simulation is lightened, and realistic audio simulation is possible by providing audio parameters to the spatial objects. Further, even if the sound field space has a complex shape, audio simulation conforming to an actual space is possible as such sound field space can be realized by combining spatial objects. Moreover, even if the environment in the sound field space changes momentarily and the propagation characteristics of sounds composing the audio transmission system change in real-time, a more realistic audio simulation is realized in a simplified manner.

According to the game device of the present invention, as audio simulation is performed based on position information etc. of the object to be displayed on the screen, realized is audio simulation giving consideration to the position, shape, direction, size, etc. of the object to be displayed on the screen.

The information recording medium of the present invention is capable of making a computer function as the audio signal processing device or the game device according to the present invention.

What is claimed is:

1. An audio signal processing device for generating audio signals by arranging objects in a virtual three-dimensional space and performing, at a prescribed listening position, audio simulation to sounds produced from a prescribed sounding position;
    wherein said audio signal processing device comprises audio signal processing means for performing said audio simulation by structuring a sound field space, which is subject to said audio simulation, by combining spatial objects;
    wherein said audio signal processing means generates said audio signals by dividing said audio simulation into direct sound, primary reflected sound, high-order reflected sound, and respectively performing simulation thereto;
    wherein said audio signal processing means generates audio signals of said direct sound pursuant to distance data between said sounding position and listening position, and said medium parameter; and
    wherein, when the sounding position moves relatively to the listening position in the sound field space composed of a plurality of spatial objects connected to each other, said audio signal processing means generates audio signals of said direct sound by:
        setting two faces for dividing said sound field space into three areas and, of said two faces, setting the face near the listening position as face R and the face far from the listening position as face G;
        setting the area including the listening position and divided by face R as area X, setting the area divided by face R and face G as area Y, and setting the remaining area as area Z; and
        setting the intersections of the movement locus of the sounding position with face R and face G respectively as point B and point E, and setting a prescribed point preset on face G as point D;
    wherein, when the sounding position is positioned in area Z, setting the sum of the length of the perpendicular line drawn from the sounding position to face G and the length between the listening point and point D as the propagation distance of the direct sound;
        when the sounding position is positioned in area Y, obtaining point C which interiorly divides segment BD to become BA to AE when the sounding position is set as point A, and setting the distance between the listening position and point C as the propagation distance of the direct sound; and
        when the sounding position is positioned in area X, setting the distance between the listening position and the sounding position as the propagation distance.

2. An audio signal processing device for generating audio signals by arranging objects in a virtual three-dimensional space and performing, at a prescribed listening position, audio simulation to sounds produced from a prescribed sounding position;
    wherein said audio signal processing device comprises audio signal processing means for performing said audio simulation by structuring a sound field space, which is subject to said audio simulation, by combining spatial objects;

wherein said audio signal processing means generates said audio signals by dividing said audio simulation into direct sound, primary reflected sound, high-order reflected sound, and respectively performing simulation thereto;

wherein said audio signal processing means generates audio signals of said direct sound pursuant to distance data between said sounding position and listening position, and said medium parameter; and wherein when the sounding position moves relatively to the listening position in the sound field space composed of a plurality of spatial objects connected to each other, said audio signal processing means generates audio signals of said direct sound by:

setting two faces for dividing said sound field space into three areas and, of said two faces, setting the face near the listening position as face R and the face far from the listening position as face G;

setting the area including the listening position and divided by face R as area X, setting the area divided by face R and face G as area Y, and setting the remaining area as area Z; and setting the intersections of the movement locus of the sounding position with face R and face G respectively as point B and point E, and setting a prescribed central point preset on face G as point D;

wherein, when the sounding position is positioned in area Z, setting the sum of the length of the perpendicular line drawn from the sounding position to face G and the length between the listening point and point D as the propagation distance of the direct sound;

when the sounding position is positioned in area Y, obtaining point C which interiorly divides segment BD to become BA to AE when the sounding position is set as point A, and setting the distance between the listening position and point C as the propagation distance of the direct sound; and when the sounding position is positioned in area X, setting the distance between the listening position and the sounding position as the propagation distance.

3. An audio signal processing device for generating audio signals by arranging objects in a virtual three-dimensional space and performing, at a prescribed listening position, audio simulation of sounds produced from a prescribed sounding position, wherein said audio signal processing device comprises audio signal processing means for performing said audio simulation by structuring a sound field space, which is subject to said audio simulation, by combining spatial objects; and wherein said audio signal processing means cancels said audio simulation when the output level of the sound produced from said sounding position exceeds a fixed attenuation at said listening position pursuant to distance data of said sounding position and said listening position, and a medium parameter.

4. A game device for displaying on a screen images of objects arranged in a virtual three-dimensional space, performing audio simulation at a prescribed listening position to sound produced from a prescribed sounding position, and outputting audio signals, said game device comprising:

image display means for displaying images of objects on said screen;

controller for supplying to said image display means object data for displaying on the screen images of said objects; and audio signal processing means for performing said audio simulation;

wherein said audio signal processing means performs said audio simulation by receiving said object data from said controller, structuring an audio transmission system based on said object data, and composing the sound field space subject to said audio simulation by combining spatial objects;

wherein said audio signal processing means generates said audio signals by dividing said audio simulation into direct sound, primary reflected sound, high-order reflected sound, and respectively performing simulation thereto;

wherein said audio signal processing means generates audio signals of said direct sound pursuant to distance data of said sounding position and listening position, and said medium parameter; and wherein, when the sounding position moves relatively to the listening position in the sound field space composed of a plurality of spatial objects connected to each other, said audio signal processing means generates audio signals of said direct sound by:

setting two faces for dividing said sound field space into three areas and, of said two faces, setting the face near the listening position as face R and the face far from the listening position as face G;

setting the area including the listening position and divided by face R as area X, setting the area divided by face R and face G as area Y, and setting the remaining area as area Z; and setting the intersections of the movement locus of the sounding position with face R and face G respectively as point B and point E, and setting a prescribed point preset on face G as point D;

wherein, when the sounding position is positioned in area Z, setting the sum of the length of the perpendicular line drawn from the sounding position to face G and the length between the listening point and point D as the propagation distance of the direct sound;

when the sounding position is positioned in area Y, obtaining point C which interiorly divides segment BD to become BA to AE when the sounding position is set as point A, and setting the distance between the listening position and point C as the propagation distance of the direct sound; and when the sounding position is positioned in area X, setting the distance between the listening position and the sounding position as the propagation distance.

5. A game device for displaying on a screen images of objects arranged in a virtual three-dimensional space, performing audio simulation at a prescribed listening position to sound produced from a prescribed sounding position, and outputting audio signals, said game device comprising:

image display means for displaying images of objects on said screen;

controller for supplying to said image display means object data for displaying on the screen images of said objects; and audio signal processing means for performing said audio simulation;

wherein said audio signal processing means performs said audio simulation by receiving said object data from said controller, structuring an audio transmission system based on said object data, and composing the sound field space subject to said audio simulation by combining spatial objects;

wherein said audio signal processing means generates said audio signals by dividing said audio simulation into direct sound, primary reflected sound, high-order reflected sound, and respectively performing simulation thereto;

wherein said audio signal processing means generates audio signals of said direct sound pursuant to distance data of said sounding position and listening position, and said medium parameter; and wherein, when the sounding position moves relatively to the listening position in the sound field space composed of a plurality of spatial objects connected to each other, said audio signal processing means generates audio signals of said direct sound by:

setting two faces for dividing said sound field space into three areas and, of said two faces, setting the face near the listening position as face R and the face far from the listening position as face G;

setting the area including the listening position and divided by face R as area X, setting the area divided by face R and face G as area Y, and setting the remaining area as area Z; and setting the intersections of the movement locus of the sounding position with face R and face G respectively as point B and point E, and setting a prescribed central point preset on face G as point D;

wherein, when the sounding position is positioned in area Z, setting the sum of the length of the perpendicular line drawn from the sounding position to face G and the length between the listening point and point D as the propagation distance of the direct sound;

when the sounding position is positioned in area Y, obtaining point C which interiorly divides segment BD to become BA to AE when the sounding position is set as point A, and setting the distance between the listening position and point C as the propagation distance of the direct sound; and when the sounding position is positioned in area X, setting the distance between the listening position and the sounding position as the propagation distance.

6. A game device for displaying on a screen images of objects arranged in a virtual three-dimensional space, performing audio simulation at a prescribed listening position to sound produced from a prescribed sounding position, and outputting audio signals, said game device comprising:

image display means for displaying images of objects on said screen;

controller for supplying to said image display means object data for displaying on the screen images of said objects; and audio signal processing means for performing said audio simulation;

wherein said audio signal processing means performs said audio simulation by receiving said object data from said controller, structuring an audio transmission system based on said object data, and composing the sound field space subject to said audio simulation by combining spatial objects; and wherein said audio signal processing means cancels said audio simulation when the output level of the sound produced from said sounding position exceeds a fixed attenuation at said listening position pursuant to distance data of said sounding position and said listening position, and a medium parameter.

* * * * *